(12) United States Patent
Koutsaftis et al.

(10) Patent No.: US 11,659,470 B2
(45) Date of Patent: May 23, 2023

(54) FAST INTER-BASE STATION RING (FIBR): NEW MILLIMETER WAVE CELLULAR NETWORK ARCHITECTURES AND PROCESSES

(71) Applicant: New York University, New York, NY (US)

(72) Inventors: Athanasios Koutsaftis, Brooklyn, NY (US); Rajeev Kumar, Brooklyn, NY (US); Pei Liu, McLean, VA (US); Shivendra S. Panwar, Freehold, NJ (US)

(73) Assignee: New York University, New York, NY (US)

( * ) Notice: Subject to any disclaimer, the term of this patent is extended or adjusted under 35 U.S.C. 154(b) by 169 days.

(21) Appl. No.: 17/085,260

(22) Filed: Oct. 30, 2020

(65) Prior Publication Data

US 2021/0136656 A1 May 6, 2021

Related U.S. Application Data

(60) Provisional application No. 62/928,345, filed on Oct. 30, 2019.

(51) Int. Cl.
| | | |
|---|---|---|
| *H04L 12/42* | (2006.01) | |
| *H04L 1/00* | (2006.01) | |
| *H04W 40/32* | (2009.01) | |
| *H04W 48/16* | (2009.01) | |
| *H04W 48/20* | (2009.01) | |
| *H04W 76/15* | (2018.01) | |
| *H04W 40/22* | (2009.01) | |

(Continued)

(52) U.S. Cl.
CPC .......... *H04W 40/32* (2013.01); *H04L 1/1874* (2013.01); *H04L 1/1896* (2013.01); *H04L 12/42* (2013.01);
(Continued)

(58) Field of Classification Search
None
See application file for complete search history.

(56) References Cited

U.S. PATENT DOCUMENTS 10,652,045 B2 * 5/2020 Regev ................... H04L 12/42
10,791,507 B1 * 9/2020 Mukherjee ............ H04W 4/029
(Continued)

FOREIGN PATENT DOCUMENTS

EP 3745646 A1 * 12/2020 ......... H04L 12/1407

OTHER PUBLICATIONS

R. Irmer, et al., "Multisite Field Trial for LTE and Advanced Concepts," IEEE Communications Magazine, vol. 47, No. 2, pp. 92-98, (Feb. 2009).
(Continued)

*Primary Examiner* — Ajit Patel
(74) *Attorney, Agent, or Firm* — John C. Pokotylo; Pokotylo Patent Services

(57) ABSTRACT

Fifth Generation (5G) Millimeter Wave (mmWave) cellular networks are expected to serve a large set of throughput intensive, ultra-reliable, and ultra-low latency applications. To meet these stringent requirements, while minimizing the network cost, the 3$^{rd}$ Generation Partnership Project has proposed a new transport architecture, where certain functional blocks can be placed closer to the network edge. In this architecture, however, blockages and shadowing in 5G mmWave cellular networks may lead to frequent handovers (HOs) causing significant performance degradation. To meet the ultra-reliable and low-latency requirements of applications and services in an environment with frequent HOs, a Fast Inter-Base Station Ring (FIBR) architecture is described, in which base stations that are in close proximity are grouped together, interconnected by a bidirectional counter-rotating buffer insertion ring network. FIBR enables
(Continued)

high-speed control signaling and fast-switching among BSs during HOs, while allowing the user equipment to maintain a high degree of connectivity. The FIBR architecture efficiently handles frequent HO events in mm Wave and/or Terahertz cellular systems, and more effectively satisfies the QoS requirements of 5G applications.

18 Claims, 19 Drawing Sheets

(51) Int. Cl.
    *H04L 1/1867*     (2023.01)
    *H04W 28/04*     (2009.01)
    *H04W 40/24*     (2009.01)
    *H04W 88/08*     (2009.01)

(52) U.S. Cl.
    CPC ........... *H04W 28/04* (2013.01); *H04W 40/22* (2013.01); *H04W 40/246* (2013.01); *H04W 48/16* (2013.01); *H04W 48/20* (2013.01); *H04W 76/15* (2018.02); *H04W 88/085* (2013.01)

(56) References Cited

U.S. PATENT DOCUMENTS

| | | | | |
|---|---|---|---|---|
| 11,219,076 | B1* | 1/2022 | Marupaduga | H04B 7/0447 |
| 2018/0368109 | A1* | 12/2018 | Kim | H04W 72/04 |
| 2019/0045034 | A1* | 2/2019 | Alam | H04L 12/4633 |
| 2019/0320494 | A1* | 10/2019 | Jayawardene | H04L 12/2803 |
| 2020/0100137 | A1* | 3/2020 | Panchal | H04L 43/20 |
| 2020/0221518 | A1* | 7/2020 | Schmitz | H04L 47/808 |
| 2020/0383019 | A1* | 12/2020 | Yao | H04W 12/0431 |

OTHER PUBLICATIONS

R. Irmer, et al., "Coordinated Multipoint: Concepts, Performance, and Field Trial Result," IEEE Communications Magazine, pp. 102-111, (Feb. 2011).

J. G. Andrews, et al., "Modeling and Analyzing Millimeter Wave Cellular Systems," *IEEE Transactions on Communications*, vol. 65, No. 1, pp. 403-430, (Jan. 2017).

J. Park, et al., "Inter-Operator Base Station Coordination in Spectrum-Shared Millimeter Wave Cellular Networks," *IEEE Transactions on Cognitive Communications and Networking*, vol. 4, No. 3, pp. 513-528 (Sep. 2018).

H.-S. Park, et al., "Handover Mechanism in NR for Ultra-Reliable Low-Latency Communications," *IEEE Network*, vol. 32, No. 2, pp. 41-47 (Mar.-Apr. 2018).

I. K. Jain, et al., "Can Millimeter Wave Cellular Systems provide High Reliability and Low Latency? An analysis of the impact of Mobile Blockers," *Department of Electrical and Computer Engineering, Tandon School of Engineering*, NYU, NY 11201, USA, arXiv preprint: 1807.04388, (Jul. 2018).

"LTE Handover Latency Calculation (Access Node)", Techplayon. com, http://www.techplayon.com/lte-handover-latency-calculation-access-node/ (Jan. 21, 2018).

* cited by examiner

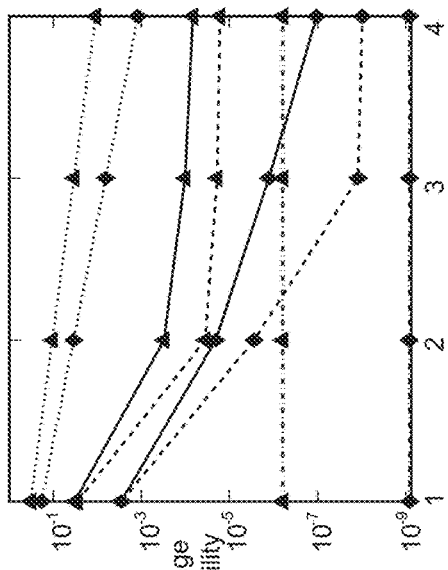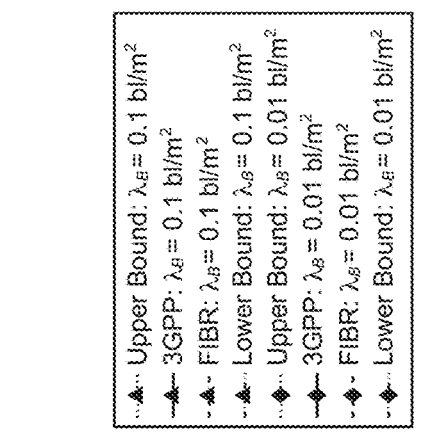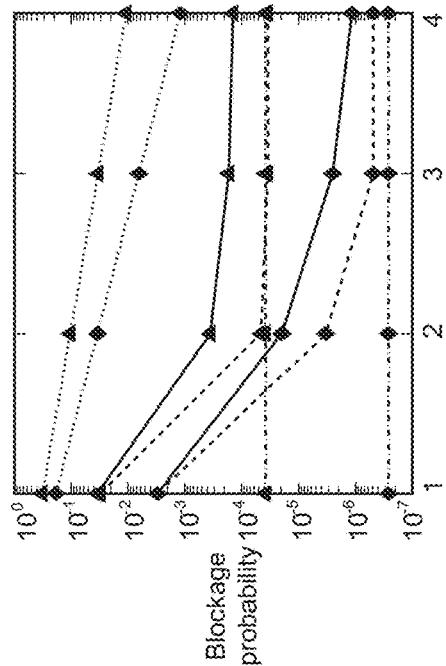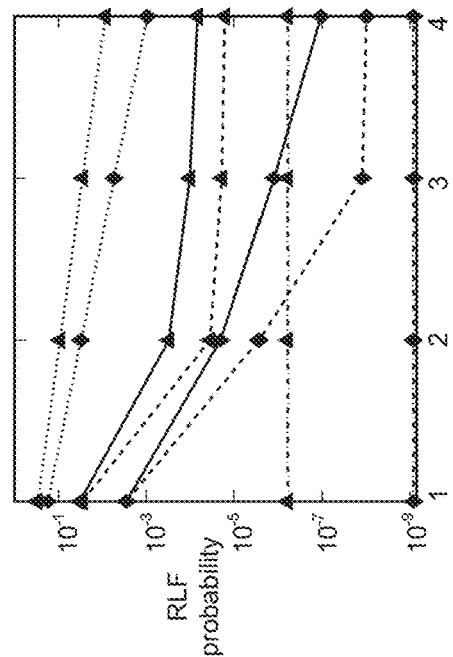
FIGURE 7(a)
FIGURE 7(b)
FIGURE 8(a)
FIGURE 8(b)

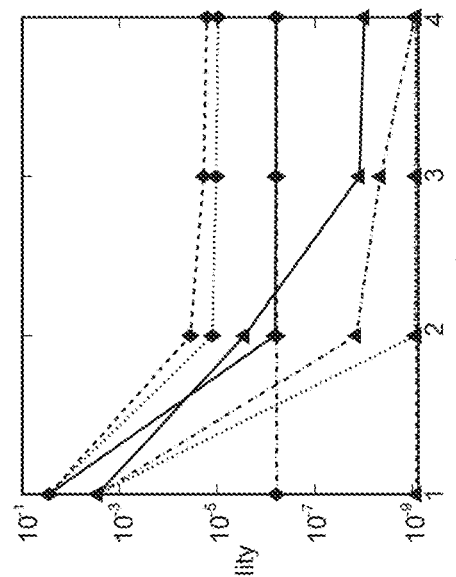
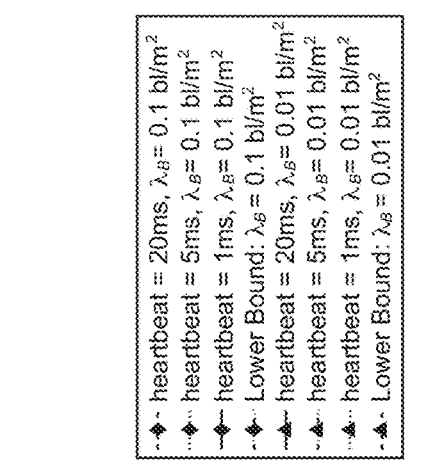
FIGURE 9(a)
FIGURE 9(b)

FAST INTER-BASE STATION RING (FIBR): NEW MILLIMETER WAVE CELLULAR NETWORK ARCHITECTURES AND PROCESSES

§ 0. RELATED APPLICATION(S)

This application claims the benefit of U.S. Provisional Patent Application Ser. No. 62/928,345 (referred to as "the '345 provisional" and incorporated herein by reference), filed on Oct. 30, 2019, titled "FAST INTER-BASE STATION RING (FIBR): A NEW MILLIMETER WAVE CELLULAR NETWORK ARCHITECTURE" and listing Athanasios KOUTSAFTIS, Rajeev KUMAR, Pei LIU, and Shivendra S. PANWAR as the inventors. Each of the references cited in the '345 provisional is also incorporated herein by reference. The present invention is not limited to requirements of the particular embodiments described in the '345 provisional.

§ 1. BACKGROUND

§ 1.1 Field of the Invention

The present description concerns mobile communications. In particular, the present description concerns providing improved handover with low latency in response to blockages, especially in mm Wave and/or Terahertz cellular networks, or any blockage-driven cellular networks resulting in frequent handovers (e.g., 5G networks).

§ 1.2 Background Information

The discussion of any technical subject matter in this section is not an admission that such technical subject matter is prior art. Further, the discussion of different technical subject matter in this section is not an admission that it would have been obvious to combine such different technical subject matter.

§ 1.2.1 $5^{TH}$ Generation (5G) and $3^{RD}$ Generation Partnership Project (3GPP) Background Information Fifth Generation (5G) cellular networks are expected to serve a variety of new applications and services including eHealth, Augmented Reality (AR) and Virtual Reality (VR), and tactile Internet. The $3^{rd}$ Generation Partnership Project (3GPP) categorizes them in three different classes of services, namely, massive Machine Type communication (mMTC), enhanced Mobile BroadBand (eMBB), and Ultra-Reliable Low Latency Communication (URLLC) depending on the throughput, latency, and reliability requirements. A comprehensive set of requirements for these services and applications is presented in Table I. The high throughput requirement of eMBB services and the high traffic density required by Ultra-Reliable Low-Latency Communication (URLLC) applications (See, e.g., 3GPP TS 22.261, 5G; Service Requirements for next generation new services and markets, 3GPP Std. v15.5.0 (July 2018), incorporated herein by reference.) cannot be satisfied by the legacy sub-6 GHz band alone due to spectrum scarcity (See, e.g., M. Rybakowski, K. Safjan, V. Venkatasubramanian et al., "Challenges & solutions for above 6 GHz radio access network integration for future mobile communication systems," in Proc. of IEEE ICC (May 2016), incorporated herein by reference.). Thus, the 5G Next Generation Radio Access Network (NGRAN) will also use Millimeter Wave (mmWave) frequencies up to 52.6 GHz (See, e.g., 3GPP TS 38.101-2, 5G; NR; User Equipment (UE) radio transmission and reception; Part 2: Range 2 Standalone, 3GPP Std. v15.2.0 (July 2018), incorporated herein by reference.), where abundant bandwidth is available to support the demands of these applications and services (See, e.g., T. S. Rappaport, S. Sun, R. Mayzus et al., "Millimeter wave mobile communications for 5G cellular: It will work!" IEEE Access, vol. 1, pp. 335-349 (May 2013), incorporated herein by reference.).

TABLE I

Quality of Service (QoS) requirements and example applications for mMTC, URLLC and eMBB services (See, e.g., the documents: P. Popovski, K.F. Trillingsgaard, O. Simeone, and G. Durisi, "5G wireless network slicing for eMBB, URLLC, and mMTC: A communication theoretic view," IEEE Access, vol. 6, pp. 55765-55779 (September 2018), incorporated herein by reference.); Y. Rao, J. Jing et al., "New services & applications with 5G ultra-reliable low latency communication," 5G Americas, Tech. Rep. (November 2018), incorporated herein by reference.); and NGMN Alliance, "NGMN 5G initiative white paper," NGMN, Tech. Rep. (February 2015)[Online], Available: https://bit.ly/2HuXhdK, incorporated herein by reference.)

| Services/ Application Category | Throughput | Air-link Latency | Reliability | Example Applications |
|---|---|---|---|---|
| mMTC | 1-100 Kbps | 10 ms- 1 hr | 90% | smart city, smart home |
| URLLC | 1-10 Mbps | 1 ms | 99.9%- 99.9999% | eHealth, factory automation, robotics |
| eMBB | 0.1-10 Gbps | 4 ms | 99.9% | AR/VR, tactile Internet, 360 degrees video |

While mmWave systems are capable of transmitting at speeds of multiple gigabits-per-second on the air interface, they are quite vulnerable to blockages and shadowing. (See, e.g., K. Allen, N. DeMinco, J. Hoffman, Y. Lo, and P. Papazian, "Building penetration loss measurements at 900 MHz, 11.4 GHz, and 28.8 GHz," US Department of Commerce, National Telecommunications and Information Administration Rep, pp. 94-306 (May 1994), incorporated herein by reference.) Even the human body can cause up to 35 dB attenuation in the signal strength. (See, e.g., J. S. Lu, D. Steinbach, P. Cabrol, and P. Pietraski, "Modeling human blockers in millimeter wave radio links," ZTE Communications, vol. 10, no. 4, pp. 23-28 (November 2012), incorporated herein by reference.) Thus, mmWave links are inherently intermittent due to blockage and user mobility. Our work on the frequency of blockage events (See, e.g., the documents: I. K. Jain, R. Kumar, and S. Panwar, "Driven by capacity or blockage? A millimeter wave blockage analysis," in Proc. of International Teletraffic Congress (ITC 30) (September 2018) (incorporated herein by reference); and I. K. Jain, R. Kumar, and S. Panwar, "The impact of mobile blockers on millimeter wave cellular systems," IEEE J. Sel. Areas Commun., vol. 37, no. 4, pp. 854-868 (February 2019) (incorporated herein by reference).) suggests that a dense deployment of base stations (BSs) will be necessary to overcome blockages and satisfy the reliability requirements of URLLC applications in mmWave cellular networks. However, frequent handovers (HOs) (0.1-1 HO/sec) to maintain connectivity will be unavoidable. Our previous work (See, e.g., I. K. Jain, R. Kumar, and S. Panwar, "The impact of mobile blockers on millimeter wave cellular systems," IEEE J. Sel. Areas Commun., vol. 37, no. 4, pp. 854-868 (February 2019), incorporated herein by reference.) further suggests that in some conditions, UEs need to have either simultaneous connections with up to 12 BSs or an efficient HO mechanism to achieve the URLLC QoS requirements.

To satisfy the diverse requirements of these applications and to provide network flexibility and controllability, the 3GPP has proposed centralization of a few functions for the next Generation NodeB (gNB). The centralized part of a BS is called the gNB-CU and the decentralized part of a BS is called the gNB-DU. Furthermore, in the 3GPP transport architecture, a gNB is connected to the 5G Core Network (5G-CN) via the NG interface, gNBs are inter-connected using the Xn interface, and gNB-CU and gNB-DU are connected through the F1 logical interface (see FIG. 1(a)). The 3GPP further considers optimal placement of different functional blocks in the transport network to meet the diverse QoS requirements of applications and services. In particular, to satisfy the latency requirements of URLLC applications, the gNB-CU, the gNB-DU, and the mobile cloud can be pushed closer to the network edge. However, we argue that moving these closer to the network edge may not be practical (See, e.g., A. Sutton, "5G network architecture, design and optimisation," British Telecom, Tech. Rep. (January 2018) [Online]. Available: https://bit.ly/2E8J0m3, incorporated herein by reference.) since during each HO, data and cloud computation needs to be forwarded. Moreover, as the 3GPP transport architecture is connection oriented, i.e., a UE has to establish a connection to BSs before receiving/transmitting a packet, the frequent HOs due to blockages present a severe challenge to mmWave cellular systems (See, e.g., the documents: 3GPP TS 23.501, Technical Specification Group Services and System Aspects; System Architecture for the 5G System, 3GPP Std. v15.0.0 (November 2017), incorporated herein by reference; R. Trivisonno, M. Condoluci, X. An, and T. Mahmoodi, "mIoT slice for 5G systems: Design and performance evaluation," Sensors, vol. 18, no. 2, pp. 635-651 (February 2018), incorporated herein by reference; and 3GPP TS 38.231, 5G; NR; Medium Access Control (MAC) protocol specification, 3GPP Std. v15.3.0 (September 2018), incorporated herein by reference.). Furthermore, as the mmWave channel is sporadic in nature, many HO procedures may result in Radio Link Failure (RLF) if the signal quality to the source or the target BS deteriorates during the HO procedure, due to blockage or UE mobility. For example, if a UE is moving at 120 km/s and the user plane service interruption time is 1 ms, 99.999% service reliability cannot be satisfied. (See, e.g., H. Park, Y. Lee, T. Kim, B. Kim, and J. Lee, "Handover mechanism in NR for ultra-reliable low-latency communications," IEEE Netw., vol. 32, no. 2, pp. 41-47 (March 2018), incorporated herein by reference.) Thus, maintaining a high application QoS during frequent HOs and UE mobility is a major challenge for mmWave networks.

§ 1.2.2 Ring Architecture Background

Ring local area networks, such as token rings, attracted a lot of interest in the 1980's. (See, e.g., W. Bux et al., "Architecture and design of a reliable token-ring network," IEEE J. Sel. Areas Commun., vol. 1, no. 5, pp. 756-765 (November 1983), incorporated herein by reference.) In token rings, a node is allowed to transmit only when it receives a free token. Then, the node removes the free token and replaces it with a busy one, indicating that the ring is currently occupied by the node. Major disadvantages such as fairness among nodes and node failures were addressed. (See, e.g., the documents: W. Dobosiewicz and P. Gburzynski, "On token protocols for high-speed multiple-ring networks," in Proc. of IEEE ICNP (October 1993), incorporated herein by reference; and R. Cohen and A. Segall, "Multiple logical token-rings in a single highspeed ring," IEEE Trans. Commun., vol. 42, no. 234, pp. 1712-1721 (February 1994), incorporated herein by reference.)

In buffer insertion rings, when a packet arrives at a ring node, its destination address is examined and, if it is the current node, the packet is removed from the ring and placed in a reception buffer, otherwise, it is passed to the next node. The performance analysis of single-channel and multi-channel buffer insertion rings is presented in the article W. Bux and M. Schlatter, "An approximate method for the performance analysis of buffer insertion rings," IEEE Trans. Commun., vol. 31, no. 1, pp. 50-55 (January 1983), incorporated herein by reference.

The Resilient Packet Ring (RPR) network was introduced in IEEE 802.17. (See, e.g., F. Davik et al., "IEEE 802.17 resilient packet ring tutorial," IEEE Commun. Mag., vol. 42, no. 3, pp. 112-118 (August 2004), incorporated herein by reference.) It consists of two counter-rotating rings, which improves the reliability of the ring topology. While RPR allows packet-based access to the ring, the traffic scheduling policy is still flow-based with the aim of achieving a fair bandwidth sharing policy among all RPR stations.

All of the foregoing ring technologies were focused on exploiting the broadcast nature of rings, and the cost efficient shared access to high bandwidth for multiple stations that it offers.

§ 1.2.3 Background on Handover (HO) Techniques and Multi-Connectivity

HOs are well studied in the legacy LTE heterogeneous networks (See, e.g., the documents: Y. Li, B. Cao, and C. Wang, "Handover schemes in heterogeneous LTE networks: challenges and opportunities," IEEE Wireless Commun., vol. 23, no. 2, pp. 112-117 (April 2016), incorporated herein by reference; X. Yan, Y. A. Sekercioglu, and S. Narayanan, "A survey of vertical handover decision algorithms in fourth generation heterogeneous wireless networks," Comput. Netw., vol. 54, no. 11, pp. 1848-1863 (August 2010), incorporated herein by reference; and D. Xenakis, N. Passas, L. Merakos, and C. Verikoukis, "Mobility management for femtocells in LTE-advanced: Key aspects and survey of handover decision algorithms," IEEE Commun. Surveys Tuts., vol. 16, no. 1, pp. 64-91 (July 2014), incorporated herein by reference.). However, all these HO procedures are based on the break-before-make technique. That is, under the break-before-make technique, the UE breaks the connection with its source BS before the HO procedure to its target BS has been initiated. For LTE networks, this results in an around 40-50 ms user plane latency or SIT. (See, e.g., H. Park, Y. Lee, T. Kim, B. Kim, and J. Lee, "Handover mechanism in NR for ultra-reliable low-latency communications," IEEE Netw., vol. 32, no. 2, pp. 41-47 (March 2018), incorporated herein by reference.) To reduce the service interruption time during HO procedure, 3GPP has introduced Make-Before-Break (MBB) and Random Access Channel (RACH)-less techniques. (See, e.g., 3GPP TS 36.300, Evolved universal terrestrial radio access (E-UTRA) and evolved universal terrestrial radio access network (E-UTRAN), 3GPP Std. v15.5.0 (March 2019), incorporated herein by reference.) In MBB, the UE breaks the connection with its source BS only after the HO procedure is completed. In RACH-less HO, the UE skips the RACH procedure to the target BS. The MBB combined with RACH-less HO technique can reduce the service interruption time to 6 ms. Furthermore, the service interruption time can be further decreased to 0 ms if the synchronized RACH-less technique is used, where the target BS starts sending downlink data before receiving the HO complete message. (See, e.g., H. Park, Y. Lee, T. Kim, B. Kim, and J. Lee, "Handover mechanism in NR for ultra-reliable low-latency communications," IEEE Netw., vol. 32, no. 2, pp. 41-47 (March 2018), incorporated herein by reference.)

The aforementioned techniques have the potential to reduce the HO delay. However, the HO process will fail if the channel conditions for both the source BS and the target BS deteriorate, due to simultaneous and sudden blockages, which may occur frequently in mmWave networks. (See, e.g., I. K. Jain, R. Kumar, and S. Panwar, "Driven by capacity or blockage? A millimeter wave blockage analysis," in Proc. of International Teletraffic Congress (ITC 30) (September 2018), incorporated herein by reference.) Note that HO failure in 5G mmWave cellular networks may not only occur due to blockages but also as a result of UE mobility; UE mobility is the major cause of HO failures in the legacy LTE network. (See, e.g., H.-D. Bae, B. Ryu, and N.-H. Park, "Analysis of handover failures in LTE femtocell systems," in Proc. of IEEE ATNAC (November 2011), incorporated herein by reference.) The present inventors anticipate that HO failures due to UE mobility will further escalate. To meet the reliability requirement of URLLC applications, the HO failure rate must be kept significantly low.

To ameliorate the intermittent connectivity of mmWave systems, multi-connectivity has been considered by the 3GPP, industry, and the research community. (See, e.g., the documents: 3GPP TS 37.340, Universal Mobile Telecommunications System (UMTS); LTE; 5G; NR; Multi-connectivity; Overall description; Stage2, 3GPP Std. v15.3.0 (September 2018), incorporated herein by reference; and A. Ravanshid et al., "Multi-connectivity functional architectures in 5G," in Proc. of IEEE ICC (May 2016), incorporated herein by reference.) In the context of multi-connectivity, two ideas have been put forward in the literature: (i) all BSs transmit the same signals to the UE, which helps in achieving a higher reliability at the cost of significant wastage of physical resources (See, e.g., A. Ravanshid et al., "Multi-connectivity functional architectures in 5G," in Proc. of IEEE ICC (May 2016), incorporated herein by reference.), and (ii) a single BS transmits the signal, while the UE maintains connectivity to multiple BSs (See, e.g., V. Petrov, D. Solomitckii, A. Samuylov, et al., "Dynamic multiconnectivity performance in ultra-dense urban mmwave deployments," IEEE J. Sel. Areas Commun., vol. 35, no. 9, pp. 2038-2055 (2017), incorporated herein by reference.). The latter option may result in lower reliability as compared to the former but avoids wastage of resources. (See, e.g., A. Ravanshid et al., "Multi-connectivity functional architectures in 5G," in Proc. of IEEE ICC (May 2016), incorporated herein by reference.) However, a high reliability can be attained if a UE can switch to other BSs very fast. (See, e.g., C. Tatino, I. Malanchini, N. Pappas, and D. Yuan, "Maximum throughput scheduling for multi-connectivity in millimeter-wave networks," in Proc. of IEEE WiOpt (May 2018), incorporated herein by reference.)

The document, M. Polese, M. Giordani, M. Mezzavilla et al., "Improved handover through dual connectivity in 5G mmwave mobile networks," IEEE J. Sel. Areas Commun., vol. 35, no. 9, pp. 2069-2084 (2017), incorporated herein by reference proposed a multi-RAT dual connectivity (DC) framework to perform fast switching between BSs. In this work, it is assumed that a UE is connected to a single LTE BS and a single mmWave BS. During a blockage, the UE switches to the LTE BS after receiving a HO command, and once a new mmWave BS is found, the UE switches to the discovered mmWave BS. However, as the mmWave BSs can be frequently blocked (See, e.g., I. K. Jain, R. Kumar, and S. Panwar, "The impact of mobile blockers on millimeter wave cellular systems," IEEE J. Sel. Areas Commun., vol. 37, no. 4, pp. 854-868 (February 2019), incorporated herein by reference.) and many of the application flows cannot be offloaded to an LTE BS due to its limited bandwidth as compared to mmWave [32] (See, e.g., D. H. Hagos and R. Kapitza, "Study on performance-centric offload strategies for LTE networks," in Proc. of IFIP WMNC (April 2013), incorporated herein by reference.), the QoS of applications can degrade significantly.

The document, D. H. Hagos and R. Kapitza, "Study on performance-centric offload strategies for LTE networks," in Proc. of IFIP WMNC (April 2013), incorporated herein by reference considered offloading traffic to a WiFi network during blockages to complement limited LTE resources. WiFi systems are designed to achieve high throughput but not consistently low latency. (See, e.g., C. Pei, Y. Zhao et al., "WiFi can be the weakest link of round trip network latency in the wild," in Proc. of IEEE INFOCOM (April 2016), incorporated herein by reference.)

The document, V. Petrov, D. Solomitckii, A. Samuylov, et al., "Dynamic multiconnectivity performance in ultra-dense urban mmwave deployments," IEEE J. Sel. Areas Commun., vol. 35, no. 9, pp. 2038-2055 (2017), incorporated herein by reference considered different multi-connectivity scenarios to study the impact of the degree of connectivity. A high order of multi-connectivity will result in a higher reliability. However, this also results in increased signaling and computation overhead.

§ 1.2.4 Unmet Needs

As can be appreciated from the foregoing, it would be useful to provide improved HO with low latency, especially in 5G networks.

§ 2. SUMMARY OF THE INVENTION

To alleviate the performance degradation of applications due to frequent HOs in networks, such as 5G mm Wave networks for example, the present application describes a ring-based transport network architecture, called the Fast Inter-Base Station Ring (FIBR). (See FIG. 1(b).) In example implementations of FIBR, a number of BSs (gNB-DUs) in close proximity are grouped together to form a bidirectional buffer insertion ring network. Example embodiments of FIBR have fast control signaling among gNB-DUs, so an option in which a single BS transmits the signal, while the UE maintains connectivity to multiple BSs, is chosen, together with fast signaling among BSs and re-selection of gNB-DUs in case of blockages. More specifically, rather than being associated with a single BS, a UE in the example FIBR architectures is associated with the Target Area Gateway (TA-GW).

For FIBR implementations, in contrast to prior ring technologies, important considerations of a ring architecture include (1) the ring's ultra-fast capability to accommodate UEs whose point of attachment to the network can change frequently, and (2) ensuring that the connections it carries are not interrupted or delayed in order to meet 5G's URLLC objectives. Thus, example FIBR implementations, consistent with the present description, are believed to be a unique application of ring technology.

To meet the QoS requirements of URLLC applications, the TA-GW hosts the gNB-CU, Layer 2/Layer 3 (L2/L3) switching, and the edge cloud. The TA-GW connects the user to the core network without regard to which BS on the ring the UE is served by. This provides example FIBR implementations with a framework for fast signaling among gNB entities, which helps in overcoming blockages and frequent. HOs. Even when a UE has a low degree of connectivity, FIBR can provide reliability that would otherwise require a much higher degree of connectivity in the 3GPP transport network, thanks to the high speed signaling among gNB-DUs.

At least some embodiments consistent with the present description provide an example ring network for wirelessly communicating data with a mobile user equipment (UE) in a target area (TA). The example ring network includes (1) a centralized part of a base station (CUBS), and (2) a plurality of distributed parts of the base station (DUBSs) in the target area (TA), a plurality of the DUBSs being available, at a given time, for mobile data communication with the UE, wherein one of the plurality of available DUBSs is a primary serving/transmitting DUBS, wherein a control path for connectivity is maintained between the UE and the primary service DUBS, and wherein a wireless data transmission path is maintained between the UE and each of the plurality of available DUBSs.

In some example ring networks, the primary serving/transmitting DUBS includes at least one buffer for storing downlink packets destined for the UE, until receipt of the stored downlink packets is acknowledged. In some such example ring networks, responsive to a determination that the data transmission path between the UE and the primary serving DUBS is lost, the ring network (1) selects a new primary service DUBS from among the plurality of available DUBSs, and (2) transmits any downlink packets destined for the UE and stored in the at least one buffer. In at least some such example ring networks, downlink packets are stored only at a downlink buffer of the primary serving DUBS, while in other such example ring networks, downlink packets are copied and stored in a downlink buffer in each of a plurality of available DUBSs of the ring network.

In some example embodiments, the ring network is a bidirectional buffer insertion ring network.

In some example embodiments, a capacity of the ring network is higher than throughput requirements of applications served by the CUBS.

Any of the foregoing ring networks may perform an example method comprising: (a) grouping a plurality of distributed units of a base station (DUBS) in a target area (TA) to form a ring network, wherein the ring network further includes a centralized unit of the base station (CUBS); (b) responsive to a mobile user equipment (UE), entering the TA, conducting, by the UE, a search procedure to find any available DUBSs of the ring network with which the UE can communicate mobile data at a predetermined acceptable level; (c) discovering by the UE, the available DUBSs with which it can communicate mobile data; (d) selecting, a plurality of the available DUBSs; (e) submitting a request, by the UE, for the plurality of selected available DUBSs to serve as an access point for the UE on the ring network; (f) accepting, by each of the plurality of selected available DUBSs, the request and adding, by each of the plurality of selected available DUBSs, an identifier of the UE (UE ID) to an address filter database (AFD); and (g) receiving or determining, by the UE, channel state information with each of the plurality of selected available DUBSs.

In at least some implementations, the example method may further include: (h) selecting, from among the plurality of selected available DUBSs, a primary serving DUBS; and (i) maintaining (1) a control path for connectivity between the UE and the primary service DUBS, and (2) a wireless data transmission path between the UE and each of the plurality of selected available DUBSs. In at least some implementations, the example method may further include: (j) receiving a downlink packet by one of the plurality of DUBSs; (k) responsive to receiving the downlink packet, performing, by the one of the plurality of DUBSs, a lookup in its AFD to determine whether or not it serves the UE to which the packet is destined; (l) responsive to determining, by the one of the plurality of DUBSs, that it serves the UE to which the packet is destined, copying the packet to a downlink buffer for wireless transmission to the UE, and otherwise, responsive to determining, by the one of the plurality of DUBSs, that it does not serve the UE to which the packet is destined, advancing the received packet to a next DUBS in the ring network. In at least some implementations, the example method may further include: (m) receiving, by the one of the plurality of selected available DUBSs, an acknowledgement of receipt by the UE of the transmitted packet; and (n) responsive to receiving the acknowledgement, removing, by the one of the plurality of selected available DUBSs, the packet from its downlink buffer. In at least some other implementations, the example method may further include: (m) determining, by the one of the plurality of selected available DUBSs, whether or not an acknowledgement of receipt by the UE of the transmitted packet has been received; and (n) responsive to a determination that an acknowledgement of the transmitted packet has not been received, placing a buffered copy of the packet onto the ring network.

In at least some implementations, the example method may further include (h) selecting, from among the plurality of selected available DUBSs, a primary serving DUBS; (i) maintaining (1) a control path for connectivity between the UE and the primary service DUBS, and (2) a wireless data transmission path between the UE and each of the plurality of selected available DUBSs; (j) receiving a downlink packet by one of the plurality of selected available DUBSs; (k) responsive to receiving the downlink packet by the one of the plurality of selected available DUBSs, (1) removing, by the one of the plurality of selected available DUBSs, the packet from the ring network, and (2) inserting, by the one of the plurality of selected available DUBSs, the packet into its downlink buffer for wireless transmission to the UE. In at least some implementations, the example method may further include: (l) receiving, by the one of the plurality of selected available DUBSs, an acknowledgement of receipt by the UE of the transmitted packet; and (m) responsive to receiving the acknowledgement by the one of the plurality of selected available DUBSs, (1) circulating the acknowledgement in the ring network, and (2) removing, by the one of the plurality of selected available DUBSs, the packet from its downlink buffer.

In at least some implementations, the example method may further include (h) selecting, from among the plurality of selected available DUBSs, a primary serving DUBS; (i) maintaining (1) a control path for connectivity between the UE and the primary service DUBS, and (2) a wireless data transmission path between the UE and each of the plurality of selected available DUBSs; (j) receiving, by each of the plurality of selected available DUBSs, a downlink packet destined for the UE; (k) responsive to receiving, by the selected available DUBSs, the downlink packet, (1) buffering, by the selected available DUBSs, the received downlink packet, and (2) if the selected available DUBS is the primary serving DUBS, transmitting the buffered received downlink packet to the UE by the primary serving DUBS, and otherwise not transmitting the buffered received downlink packet to the UE by the non-primary service DUBS unless a further condition is met. In such example implementations, the further condition is failure to receive, within a predefined time, an acknowledgement of receipt by the UE of the transmitted packet. Alternatively, the example method may further include: (l) receiving, by each of the plurality of selected available DUBSs, an acknowledgement of receipt by the UE of the transmitted downlink packet; and (m) responsive to receiving an acknowledgement of receipt by the UE of the transmitted downlink packet, removing, by each of the plurality of selected available DUBs, the received downlink packet from its buffer. In yet another alternative, the example method may further include (l) determining that a data transmission or control path between the UE and the primary service DUBS is down; and (m) responsive to the determination that the data transmission or control path between the UE and the primary service DUBS is down, (1) selecting another one of the plurality of selected available DUBSs as a new primary service DUBS, and (2) transmitting any downlink packets destined for the UE and buffered in the new primary service DUBS, to the UE wirelessly.

In at least some implementations, the example method may further include (h) selecting, from among the plurality of selected available DUBSs, a primary serving DUBS; (i) maintaining (1) a control path for connectivity between the UE and the primary service DUBS, and (2) a wireless data transmission path between the UE and each of the plurality of selected available DUBSs; (j) receiving, by each of the plurality of selected available DUBSs, a downlink packet destined for the UE; (k) responsive to receiving the downlink packet by the selected available DUBS, if the selected available DUBS is the primary serving DUBS, buffering, by the primary serving DUBS, the received downlink packet for wireless transmission to the UE by the primary serving DUBS, and otherwise, if the selected available DUBS is not the primary serving DUBS not buffering the received downlink packet by the selected available DUBS. Such example methods may further include: (l) determining that a data transmission or control path between the UE and the primary service DUBS is down; (m) responsive to the determination that the data transmission or control path between the UE and the primary service DUBS is down, (1) selecting another one of the plurality of selected available DUBSs as a new primary service DUBS, (2) providing, via the ring network, any downlink packets destined for the UE for which no acknowledgement was received, to the new primary service DUBS, and (3) buffering, in the new primary service DUBS, the downlink packets destined for the UE for which no acknowledgment was received, for wireless transmission to the UE.

In any of the foregoing methods, the act of selecting a plurality of the available DUBS may be performed by the UE. For example, the UE may select the plurality of available DUBS using received signal strength indicator (RSSI) values.

The present application describes a new transport network design for mmWave cellular systems, which connects a group of BSs in close proximity (target area) with high speed links to form a logical ring topology. In the proposed architecture, each individual UE gets associated with the TA-GW instead of a single BS, which will significantly reduce the HO signaling overhead due to frequent HOs in mmWave cellular networks.

The present application describes a proposed 3GPP architecture in detail, and analyzes recent advances in 3GPP HO procedures. The present application particularly focuses on single-connectivity and multi-connectivity HO schemes, and computes the associated control and data plane delays.

Finally, the present application illustrates that example FIBR implementations consistent with the present description can significantly reduce the HO latency for eMBB services and URLLC applications by enabling fast switching between BSs. Using the random waypoint mobility model, the present application demonstrates that one example implementation of FIBR can achieve significantly lower blockage and RLF probabilities, as compared to the 3GPP transport network. Our results also show that one example implementation of FIBR can achieve high throughput and low user plane latency, and significantly smaller signaling overhead as compared to the 3GPP architecture. In essence, example implementations of FIBR enable opportunistic utilization of intermittent mmWave links.

In addition to having multi-connectivity between the UE and the BSs, the present inventors believe that there is a need for a paradigm shift from a connection-oriented transport network, to a more opportunistic connection-less transport network. The wireless links will become more intermittent with both 5G mmWave and the THz bands being proposed for 6G. As each individual link becomes less reliable, it is important for all UEs to harness macro-diversity from all nearby BSs. Current connection oriented transport networks require all UEs to finish a HO procedure before granting access to the new source BS. In mmWave and THz systems, the connection time for each link before an HO is at least an order of magnitude shorter than sub-6 GHz systems. As a result, the HO procedure quickly becomes very expensive in terms of signaling overhead and HO delays for such systems. In contrast, with example implementations of FIBR consistent with the present description, the data connection to each UE from the transport network is anchored at the TA-GW. Between the TA-GW and the BSs, user data is transmitted in a connection-less manner. Thus, UEs can roam freely between BSs on the same ring, as the signaling overhead due to an HO procedure is minimized. Access network level switching can be handled by the FIBR network. Such a design greatly simplifies the design of the transport network, and the HO is only necessary when a UE moves out of the TA. In such cases, the UE context information can be exchanged between respective TA-GWs.

§ 3. BRIEF DESCRIPTION OF THE DRAWINGS

FIGS. 1(a) and 1(b) illustrate transport network architecture cellular networks including, but not limited to, 5G networks. In the 3GPP transport architecture of FIG. 1(a), gNB-DU, gNB-CU and the mobile cloud can be pushed to the network edge to satisfy ultra-low latency application requirements, but frequent HOs in mmWave systems will degrade network performance. To address this, the present inventors envision a transport network architecture, as shown in FIG. 1(b), where the gNB-DU, the gNB-CU, and the mobile cloud are connected via a high-speed ring.

FIG. 2 illustrates a FIBR gNB-DU, which includes functional blocks for uplink and downlink packet processing. In the downlink ring during normal operations, IDU is disabled. Similarly, in the uplink ring during normal operations, PIU is disabled. After a failure, uplink and downlink traffic are routed to a single ring with both functional blocks enabled.

FIG. 3 illustrates 3GPP intra-gNB-CU HO procedures. (See, e.g., 3GPP TS 38.401, 5G; NG-RAN; Architecture description, 3GPP Std. v15.2.0 (July 2018), incorporated herein by reference.)

FIG. 4 illustrates 3GPP NR-DC HO. Only the master eNB (MeNB) maintains the control plane connection with the core network, thus, when the gNB-DU gets blocked, the connection to the gNB-DU is dropped and the LTE eNB starts serving the UE. Once the new gNB-DU is found, the connection to this gNB-DU is initiated. (See, e.g., 3GPP TS 38.401, 5G; NG-RAN; Architecture description, 3GPP Std. v15.2.0 (July 2018), incorporated herein by reference.).

FIGS. 7(a) and 7(b) illustrate blockage probability with 9 and 12 gNB-DUs, respectively, in UE coverage. A comparison of the FIBR and 3GPP transport architectures with different numbers of gNB-DUs in the UE coverage area, blockage density values and degrees of multi-connectivity is shown. Note that the blockage probabilities derived by simulation lie between the lower and upper theoretical bounds. The theoretical lower bound is obtained when the UE can switch to any gNB-DU instantly during a blockage event. The theoretical upper bound is obtained in a K-connectivity setting when there are only K gNB-DUs in the coverage region, i.e., the UE cannot update its K serving gNB-DUs even if they get blocked and there are unblocked gNB-DUs in UE coverage region.

FIGS. 8(a) and 8(b) illustrate RLF probability with FIBR and 3GPP transport architectures with 9 and 12 gNB-DUs, respectively, in the UE coverage area, as well as blockage density values and degrees of multi-connectivity. Note that the RLF probabilities derived by simulation lie between the lower and upper theoretical bounds. The theoretical lower bound is obtained when the UE can switch to any gNB-DU instantly during a blockage event. The theoretical upper bound is obtained in a K-connectivity setting when there are only K gNB-DUs in the coverage region, i.e., the UE cannot update its K serving gNB-DUs even if they get blocked and there are unblocked gNB-DUs in UE coverage region.

FIGS. 9(a) and 9(b) illustrate RLF probability in FIBR for different heartbeat signal periodicities, for 9 and 12 gNB-DUs, respectively, in UE coverage. As shown, the RLF probability decreases with faster heartbeat signals. In the case of a periodicity of 1 ms with multi-connectivity, it converges to the theoretical lower bound.

Figure 10:
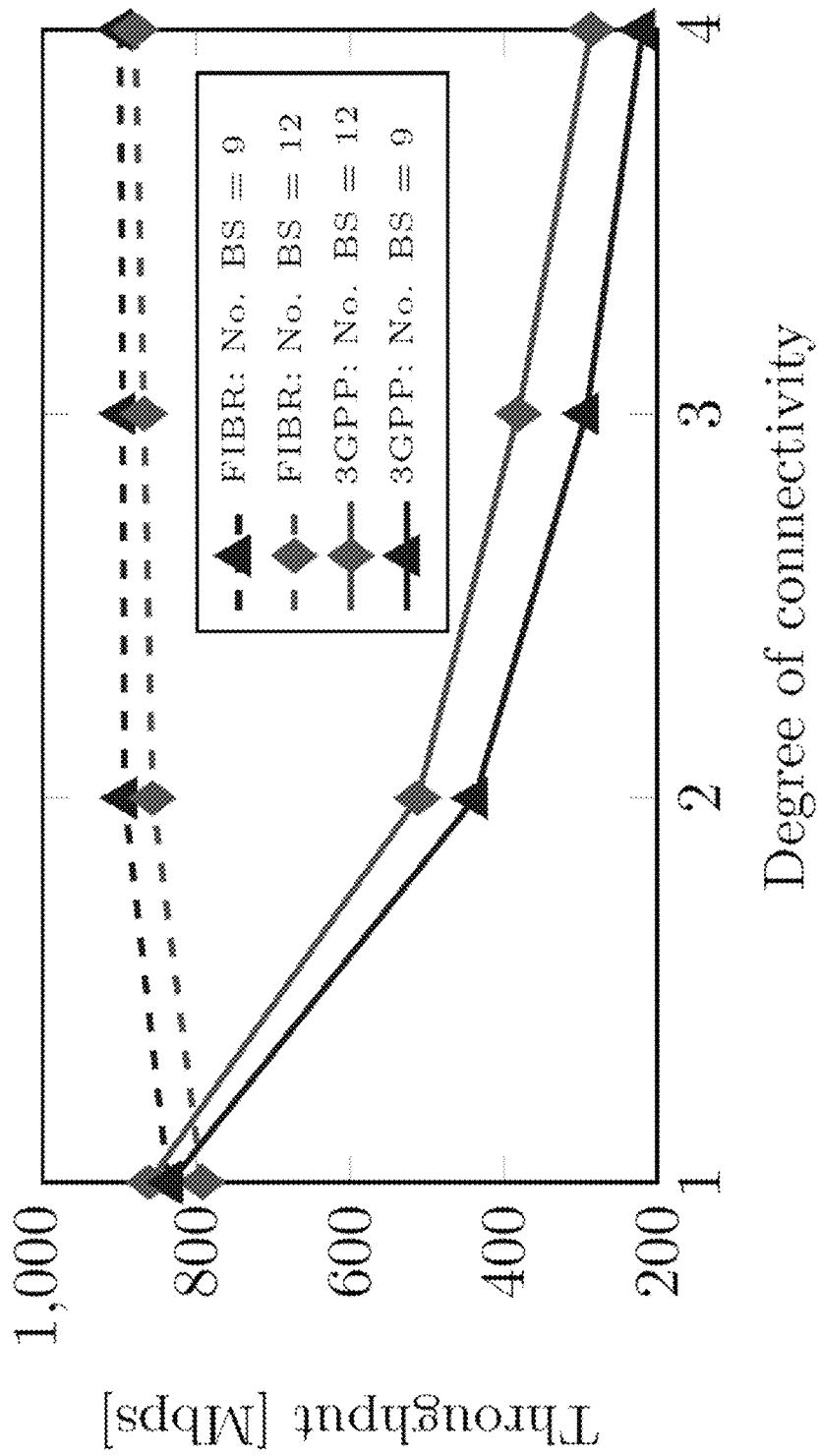

FIG. 10 illustrates a comparison of throughput in the 3GPP and FIBR architectures, with different number of gNB-DUs and degrees of connectivity. A dynamic blocker density of 0.1 bl/m² is considered.

Figure 11:
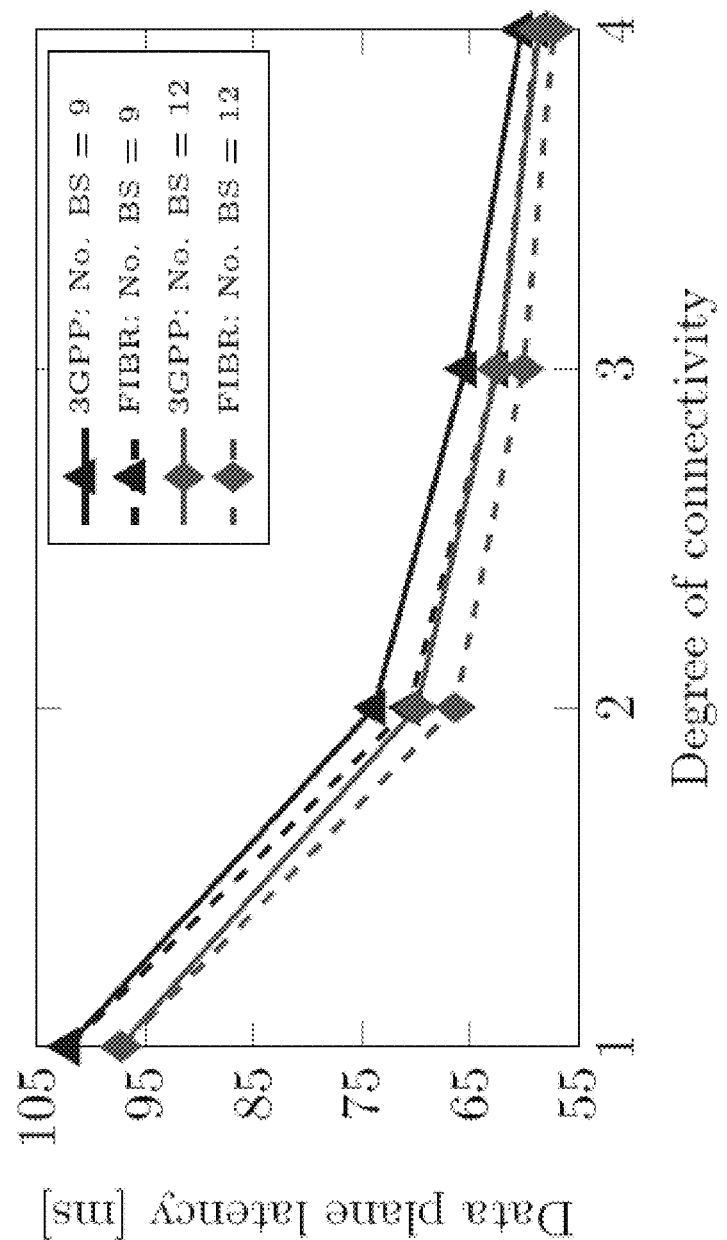

FIG. 11 illustrates a comparison of data plane latency in the 3GPP and FIBR architectures, with different number of gNB-DUs and degrees of connectivity. A dynamic blocker density of 0.1 bl/m² is considered. This delay should not associate with the handover delay, but it occurs due to outage, i.e., when the UE is blocked from all its serving gNB-DUs and the data plane is interrupted.

Figure 12:
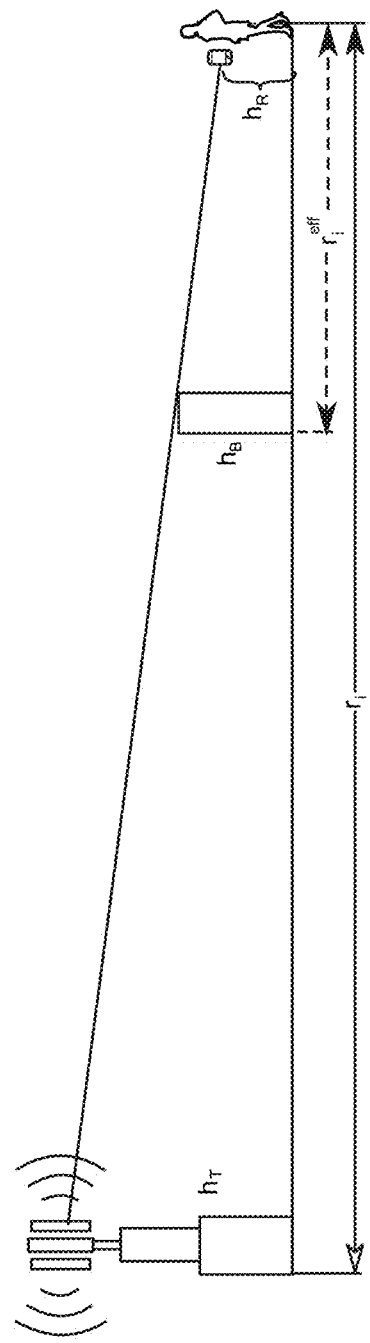

FIG. 12 illustrates blockage of a line of sight (LOS) path.

Figure 13:
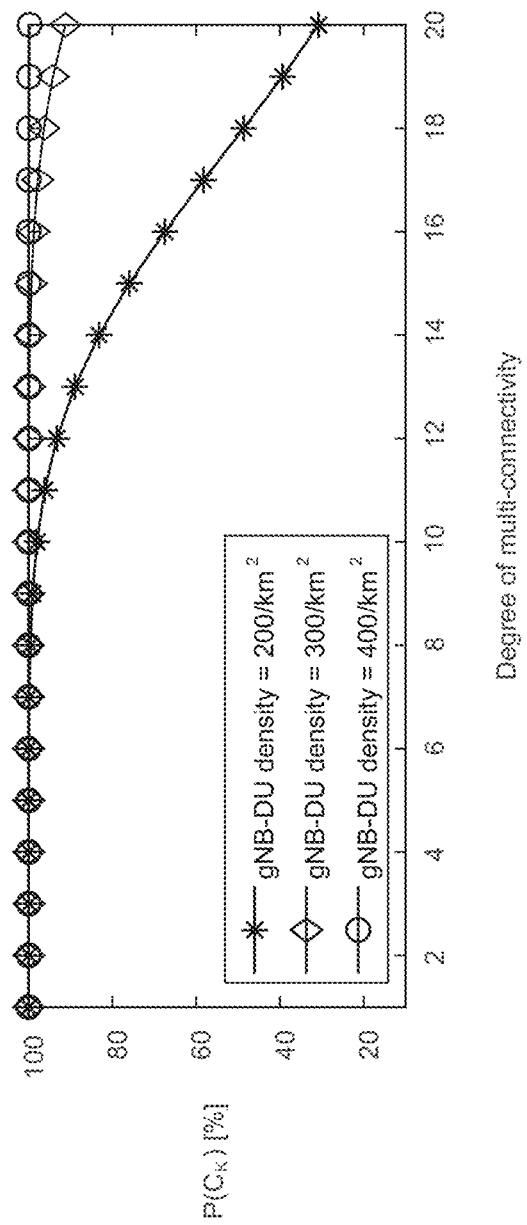
Figure 14B:
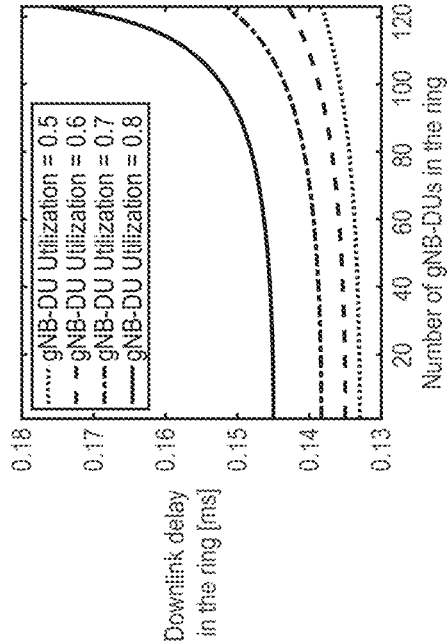
Figure 14D:
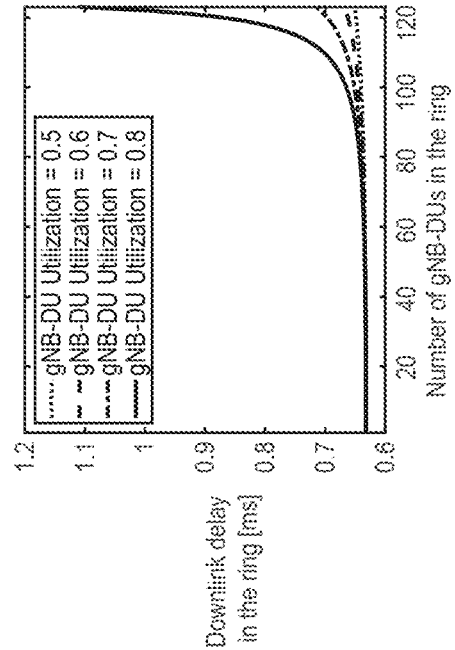
Figure 14A:
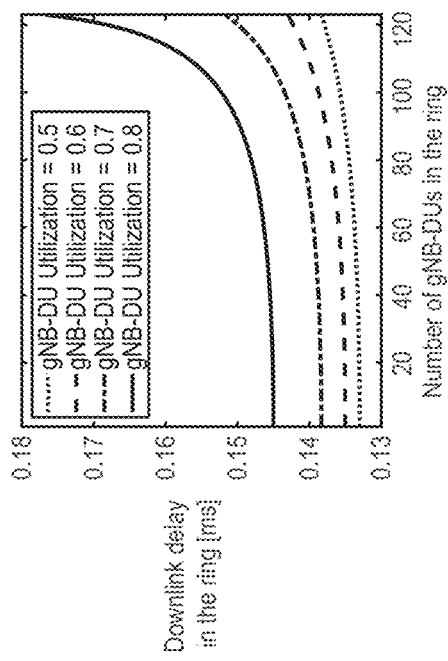
Figure 14C:
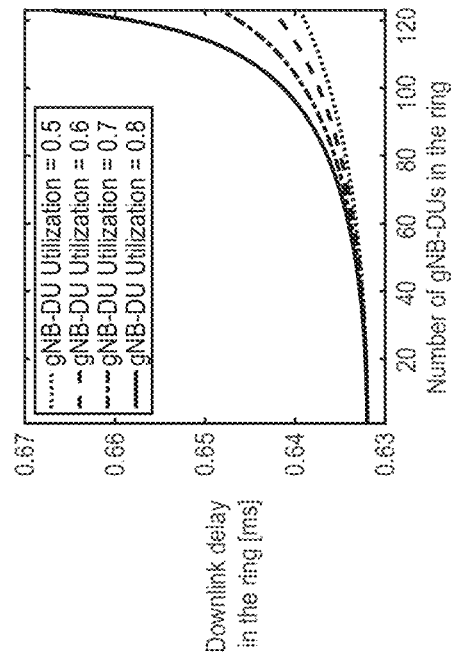

FIG. 13 illustrates the probability $P(C_K)$ of having at least K gNB-DUs in the UE coverage area. With a low gNB-DU density, it is highly unlikely to achieve a high degree of multi-connectivity. To achieve a high degree of connectivity and to satisfy the QoS requirements of URLLC applications, a high gNB-DU density is desirable.

FIGS. 14(a)-14(d) illustrate FIBR uplink and downlink queueing delay after the failure of one ring, for (a) downlink, gNB-DU priority, (b) downlink, ring priority, uplink, gNB-DU priority, and uplink, ring priority, respectively. The maximum number of gNB-DUs supported in the FIBR for 1+1 ring protection is bounded by the ring failure scenario. It is further bounded by the gNB-DU utilization that satisfies QoS requirements of URLLC applications. After considering both 1+1 ring protection and QoS requirements, the maximum number of gNB-DUs in FIBR is evaluated as approximately 120. The ring capacity is 400 Gbps and the service capacity at each gNB-DUs is 3 Gbps for the analysis.

Figure 15A:
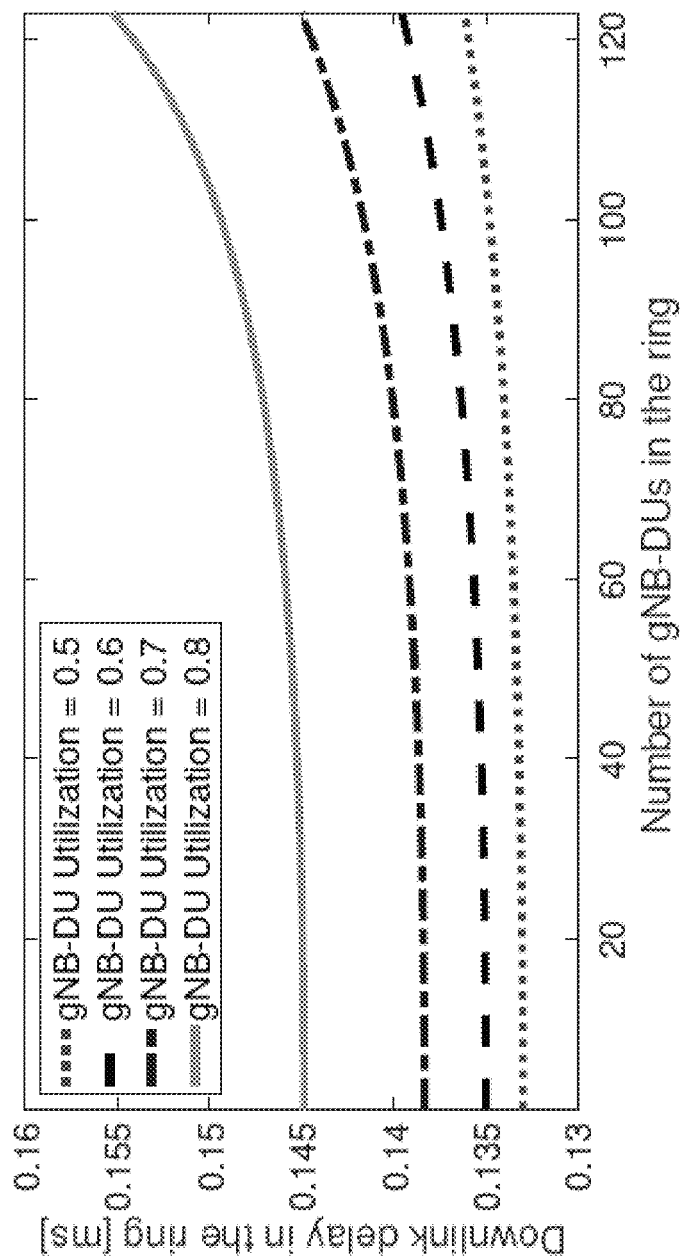

FIGS. 15(a) and (b) illustrate downlink and uplink queueing delays, respectively, during the normal operations of FIBR. As shown, downlink delay increases with the utilization of the gNB-DUs and the number of gNB-DUs in the downlink ring.

Figure 16:
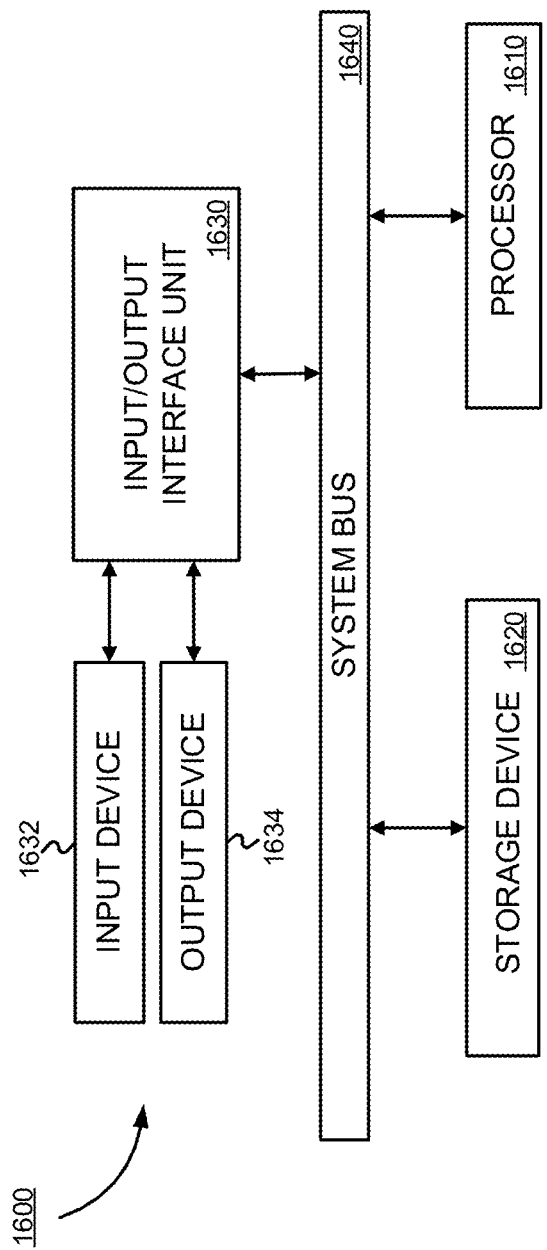

FIG. 16 is a block diagram of an exemplary machine that may perform one or more of the processes described, and/or store information used and/or generated by such processes.

Figure 17:
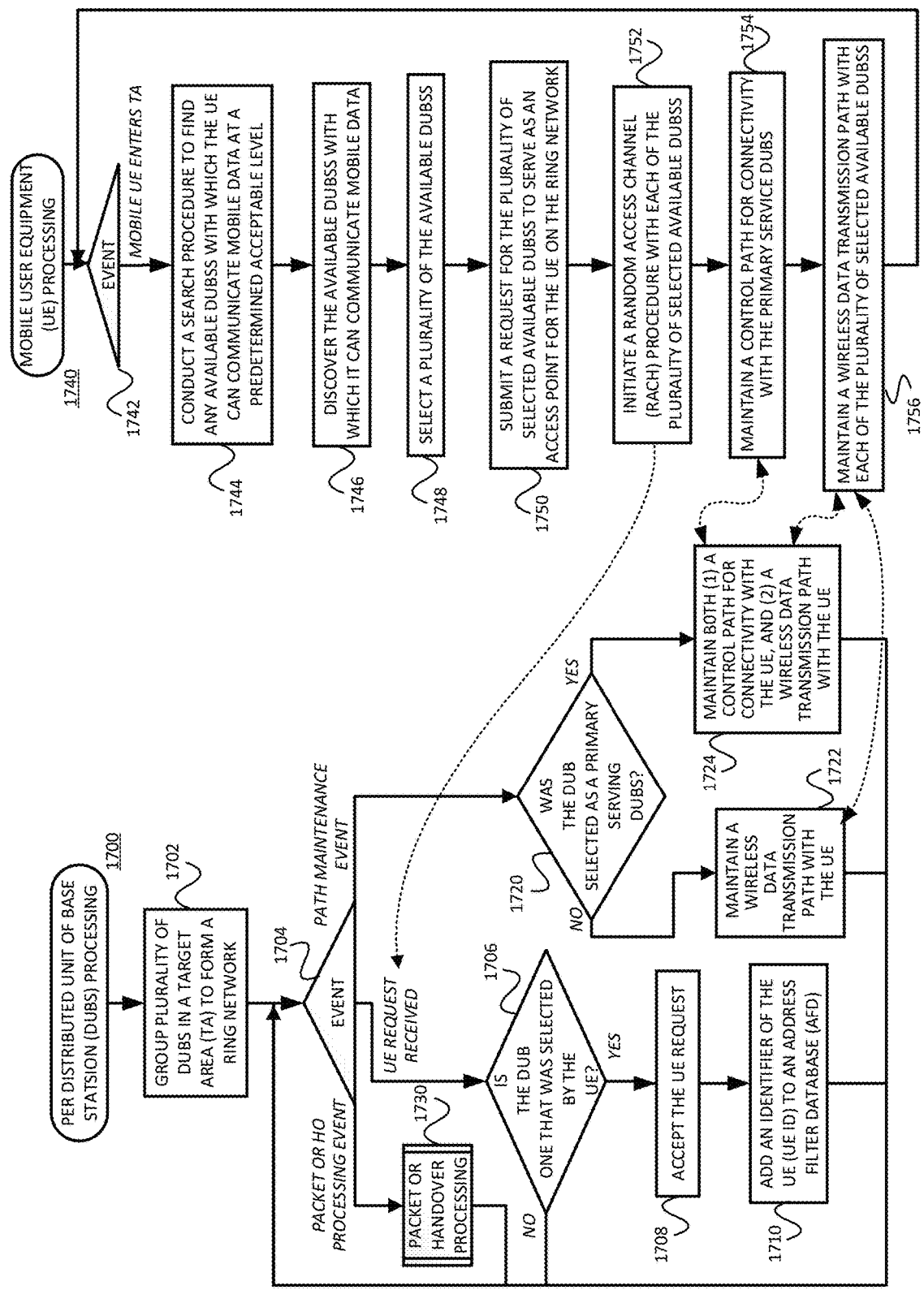

FIG. 17 is a flow diagram of example processing by gNB-DUs and UEs, in an example FIBR implementation.

Figure 18A:
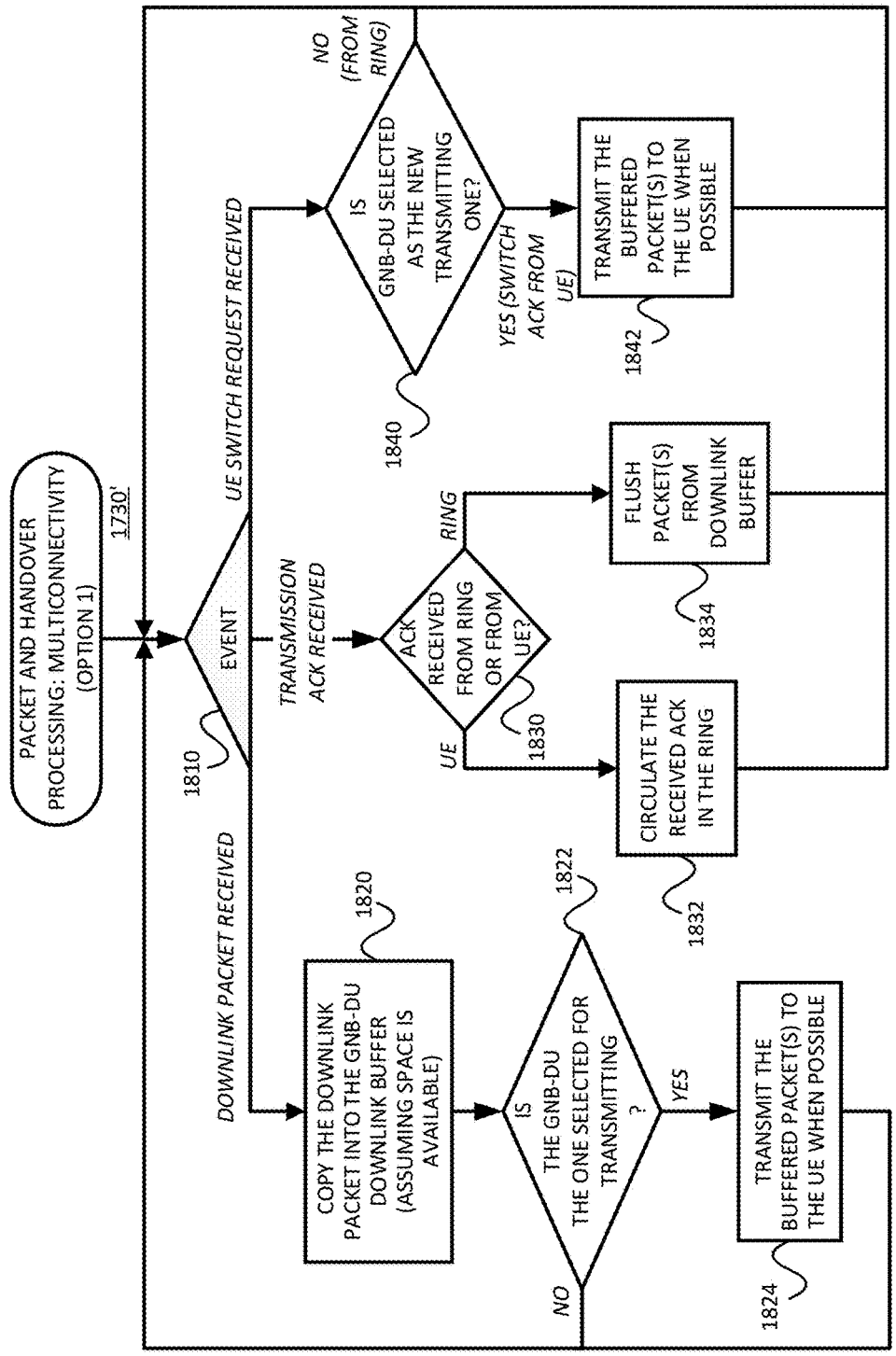
Figure 18B:
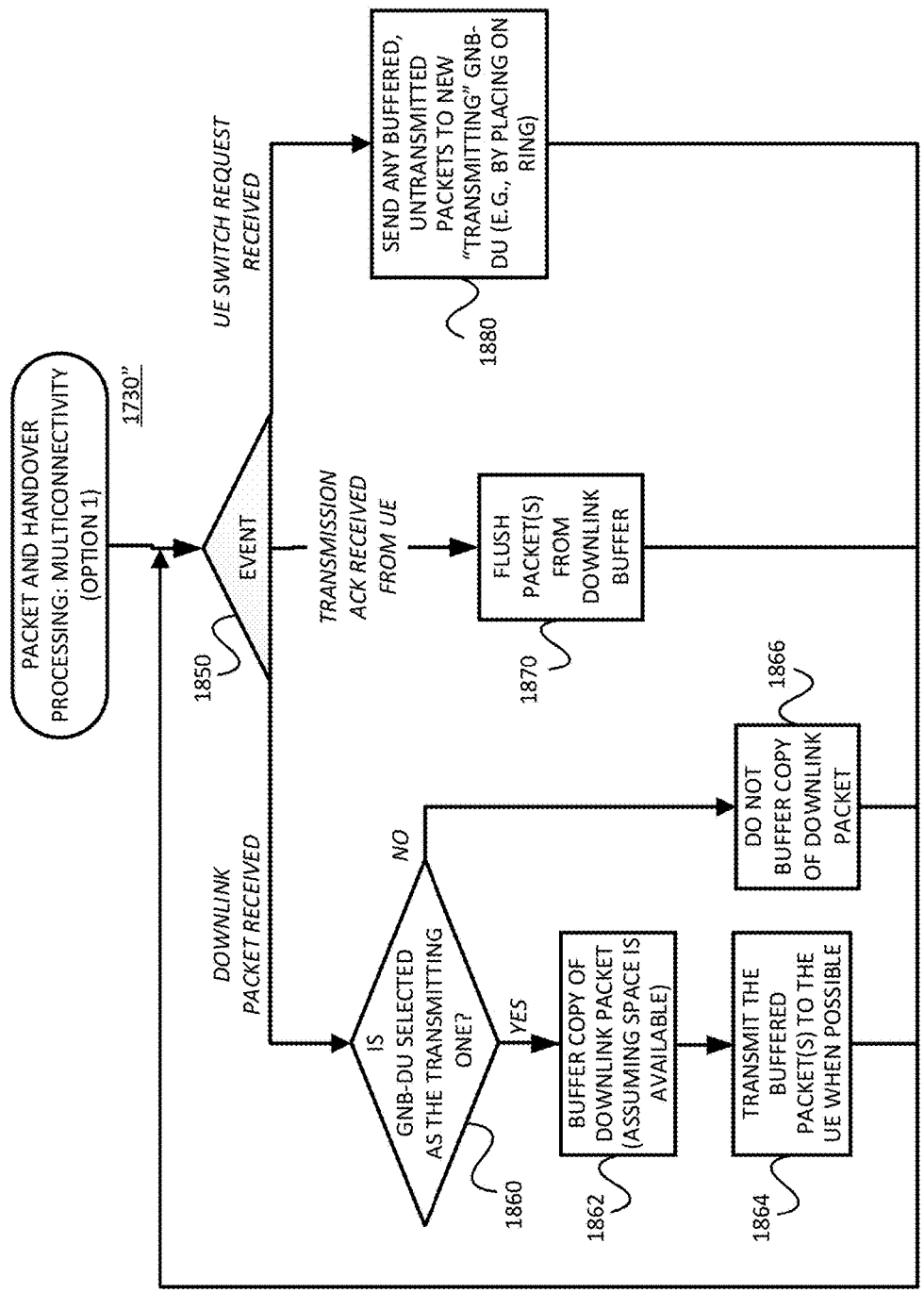

FIGS. 18(a) and 18(b) are flow diagrams of alternative methods for packet and handover processing in example multi-connectivity FIBR implementations.

§ 4. DETAILED DESCRIPTION

The present invention may involve novel methods, apparatus, message formats, and/or data structures for providing and/or supporting a wireless network having improved handover (HO). The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

FIBR is an architecture that aims to satisfy the QoS requirements of URLLC and eMBB applications by enabling fast switching between BSs. To demonstrate this, the present application first present both the FIBR and 3GPP transport network architectures in § 4.1, and then discuss the HO procedures for the two architectures in § 4.2. Then, § 4.3 presents numerical results based on simulations and compares the performance of the two architectures. First, however acronyms used in this application are listed in § 4.0.

§ 4.0 ACRONYMS

The following acronyms are used in this application:
3GPP: third generation partnership project
5GCN: 5G core network
AFD: address filter database
BS: base station
eMBB: enhanced mobile broadband
FIBR: fast inter-base station ring gNB: next generation node B
gNB-CU: centralized part of a base station
gNB-DU: decentralized part of a base station
HO: hand over
MBB: make before break
PDCP: packet data convergence protocol
RACH: random access channel
RLF: radio link failure
RRC: radio resource control
RSSI: received signal strength indicator
TA: target area
TAGW: target area gateway
UE: user mobile unit
URLLC: ultra-reliable low-latency communication § 4.1 3GPP and FIBR Architectures for 5G Cellular Systems In this section, the 3GPP transport network architecture and an example proposed FIBR architecture are described.

§ 4.1.1 3GPP Transport Network Architecture

To satisfy a wide range of applications with diverse requirements for 5G cellular systems and to provide flexibility and efficiency while reducing the network cost, the 3GPP has proposed centralization of a few functions of the gNB. The selection of a functional split will dictate the transport network capacity and latency requirements as well as the placement of nodes in the network. (See, e.g., NGMN Alliance, "NGMN overview on 5G RAN functional decomposition," NGMN, Tech. Rep. (February 2018) [Online] Available: https://bit.ly/2HuXhdK, incorporated herein by reference.) One possible design choice to meet the QoS requirements of URLLC applications is the functional split between Packet Data Convergence Protocol (PDCP) and Radio Link Control (RLC), where unlike the LTE eNB, PDCP and Radio Resource Control (RRC) constitute the centralized unit of gNB, while RLC and lower layers constitute the decentralized unit of gNB, defined as gNB-CU and gNB-DU respectively.

Figures 1A, 1B:
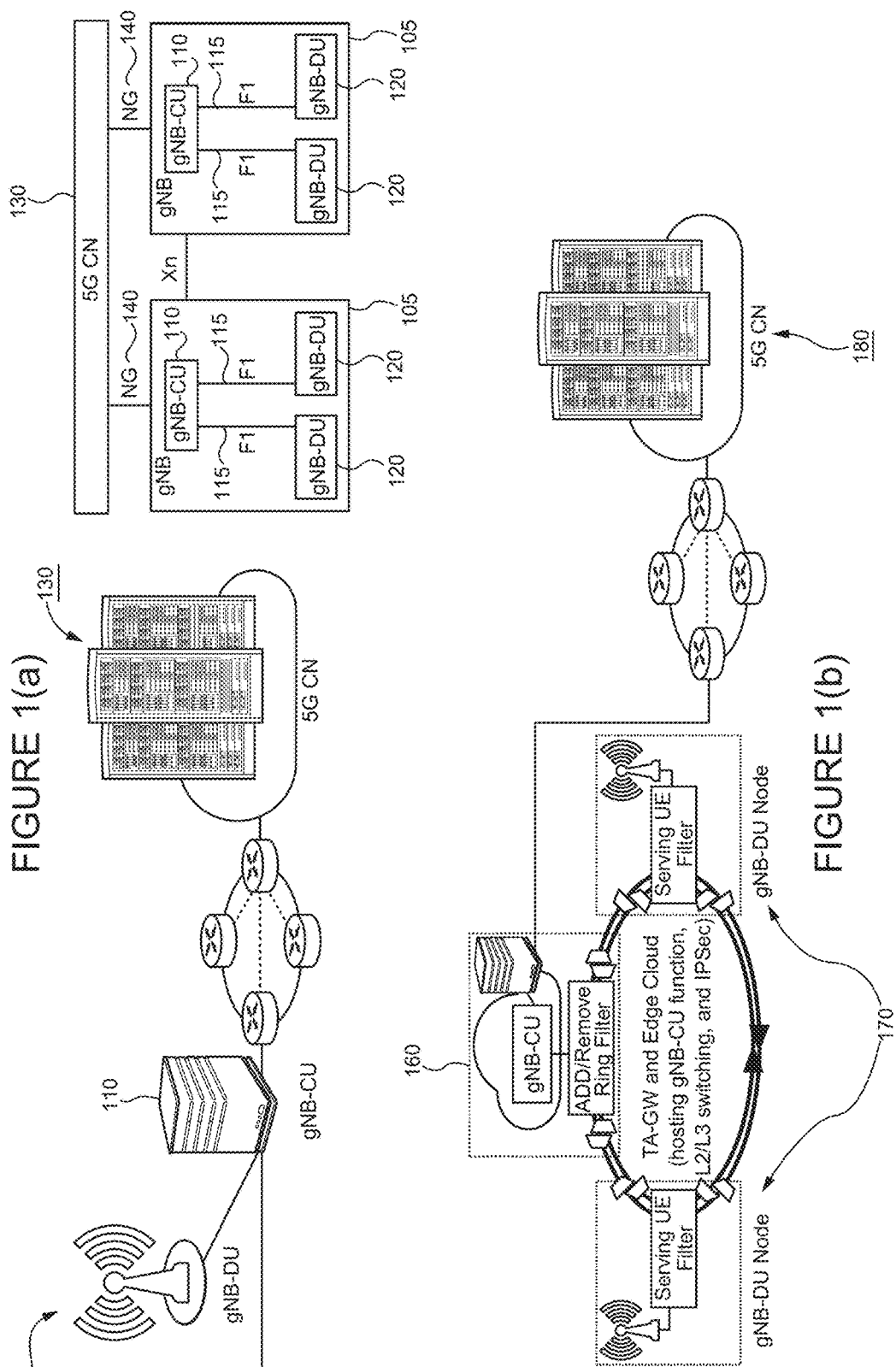

In FIG. 1(a) the 3GPP proposed functional split and the 5G transport network are shown. Each gNB 105 is connected to the 5G-CN 130 via an NG interface 140, and gNBs 105 are inter-connected via the Xn 145 interface. For any gNB 105, the gNB-CU 110 and the gNB-DUs 120 can be separated geographically. (See, e.g., CSTR-TN5G, "Transport network support of IMT-2020/5G," ITU-T, Tech. Rep. (February 2018) [Online]. Available: https://bit.ly/2HnxQM9, incorporated herein by reference.) The gNB-CU 110 processes non-real time protocols and services, while the gNB-DUs 120 may process physical, medium access control (MAC), and RLC layer protocols and real-time services. The gNB-CU 110 and the gNB-DUs 120 are connected through F1 logical interfaces 115, which has uplink and downlink capacity requirements of 3 Gbits/s and 4 Gbits/s, respectively. A gNB-DU 120 can be connected to a single gNB-CU 110, while a gNB-CU 110 can be connected to multiple gNB-DUs 120. This provides a framework for dual-connectivity or multi-connectivity. (See, e.g., the documents: B. Bertenyi, R. Burbidge, G. Masini et al., "NG radio access network (NG-RAN)," J. of ICT Stand., vol. 6, no. 1, pp. 59-76 (May 2018), herein incorporated by reference; and D. S. Michalopoulos, A. Maeder, and N. Kolehmainen, "5G multiconnectivity with non-ideal backhaul: Distributed vs cloud-based architecture," in Proc. of IEEE Globecom Wkshps. (December 2018), incorporated herein by reference.) In the multi-connectivity setting, 3GPP only considers multi-Radio Access Technology (RAT) Dual Connectivity (DC). (See, e.g., 3GPP TS 37.340, Universal Mobile Telecommunications System (UMTS); LTE; 5G; NR; Multi-connectivity; Overall description; Stage2, 3GPP Std. v15.3.0 (September 2018), incorporated herein by reference.) If a UE can support Multicarrier and Multiple Radio Access Technology Dual Connectivity (multiRAT DC), it will opt to utilize resources from two different BSs. (See, e.g., 3GPP TS 37.340, Universal Mobile Telecommunications System (UMTS); LTE; 5G; NR; Multi-connectivity; Overall description; Stage2, 3GPP Std. v15.3.0 (September 2018), incorporated herein by reference.) Thus, in addition to providing network flexibility and controllability, the new 3GPP transport architecture also provides a framework for both single and dual connectivity to achieve higher QoS requirements.

Unfortunately, however, as discussed earlier, even with the significant changes of the 3GPP transport architecture, due to the intermittent nature of mmWave links, meeting the QoS requirements of different applications, and in particular URLLC, is quite challenging. A proposed FIBR architecture consistent with the present description is introduced in § 4.1.2. The proposed FIBR architecture can satisfy the QoS requirements of those applications.

§ 4.1.2 FIBR Transport Network Architecture and Methods

FIG. 1(b) illustrates an example FIBR architecture, and FIG. 17 is a flow diagram illustrating methods performed within an example FIBR architecture. FIBR is a bidirectional buffer-insertion ring architecture, where a number of gNB-DUs 170 in close proximity are grouped together with a gNB-CU 160 and the mobile cloud. (See, e.g., FIGS. 1(b) and 1702 of FIG. 17.) The capacity of the ring is kept significantly higher than the throughput requirements of applications served by the gNB-CU 160. The coverage area of the FIBR ring is called Target Area (TA). In an example FIBR architecture consistent with the present description, a UE (not shown) is not associated with a single gNB-DU 170 and/or gNB-CU 160. Instead, it is associated with the TA-GW, which is connected to the next-generation 5G-CN 180. Note that the TA-GW can host a gNB-CU 160, L2/L3 switching functions, IPSec, and the edge cloud. In the example implementation of FIBR, since the gNB-CU 160 and gNB-DUs 170 are connected through the ring and packets are not addressed to any particular gNB-DU 170, the connectivity between the UE and the gNB-DUs 170 is connectionless. Thus, it is unnecessary to establish and tear down a connection between the UE and the gNB-DUs 170 at every HO event.

Referring to the right side of FIG. 17, an example UE consistent with the present invention may perform the following example method 1740. Responsive to a UE entering the TA, different acts of the method 1740 are performed. (Event 1742). More specifically, the UE conducts the cell search procedure to find the gNB-DUs (also referred to as distributed base stations or "DUBs" in the following) in its communication range. (Block 1744) After the UE discovers available gNB-DUs in its coverage range (Block 1746), it selects a plurality (Block 1748). For example, in a K-connectivity model, after the UE discovers all the available gNB-DUs in its coverage range (Block 1746), it selects the K best available gNB-DUs based on the Received Signal Strength Indicator (RSSI) values (Block 1748). Once a UE selects (e.g., the K best) gNB-DUs, it requests these gNB-DUs to serve as its proxies (e.g., access points) on the ring. (Block 1750)

The left side of FIG. 17 illustrates an example method 1700 that may be performed by each of the gNB-DUs. As already noted above, the gNB-DUs in a target area (TA) are grouped to form a ring network. (Block 1702) Different branches of the example method 1700 are performed in response to the occurrence of different events. (1704) Responsive to a gNB-DU receiving a request from a UE, assuming that the gNB-DU was one that was selected by the UE (Decision 1706=YES), each of the gNB-DUs accept the request (Block 1708) and add the UE ID to their Address Filter Database (AFD) (Block 1710), which contains all UEs served by the gNB-DUs.

Referring back to the right side of FIG. 17, following the cell search and selection, the example method 1740 performed by the UE starts the RACH procedure with the selected (e.g., K) gNB-DUs. (Block 1752) Furthermore, for the selection of transmitting gNB-DUs, the selected (e.g., K) gNB-DUs may use coordinated scheduling and beamforming in both uplink and downlink directions. (See, e.g., D. Lee, H. Seo et al., "Coordinated multipoint transmission and reception in LTE-advanced: deployment scenarios and operational challenges," IEEE Commun. Mag., vol. 50, no. 2, pp. 148-155 (February 2012), incorporated herein by reference.)

Referring back to event 1704, if a packet processing or handover (HO) processing event occurs (e.g., receipt of a downlink packet, receipt of an uplink packet, receipt of a transmission acknowledgement, receipt of a UE switch request, receipt of a UE switch acknowledgement, etc.), the example method 1700 performs appropriate processing, described later. (Block 1730)

Referring to the example methods 1700 and 1740, if the gNB-DU is not selected as a primary serving gNB-DU (also referred to as the "transmission" gNB-DU) for a given UE (Decision 1720=NO), it maintains a wireless data transmission path with that given UE. (Blocks 1722, and 1756). If, on the other hand, the gNB-DU was selected as the primary serving gNB-DU for a given UE (Decision 1720=YES), it maintains both (1) a control path for connectivity with the given UE, and (2) a wireless data transmission path with the UE. (Blocks 1724, 1754 and 1756)

Note that FIBR is a Layer 2 scheme to achieve fast HO. Various physical layer techniques can be used. Since FIBR is capable of fast switching among BSs, it encourages air interfaces to utilize ephemeral and less reliable links, without decreasing the overall service reliability.

Note that there can be two scenarios of blockages. In the first blockage scenario, if the primary serving gNB-DU gets blocked, the UE switches to one of a number of secondary gNB-DUs (i.e., those of the K selected gNB-DUs that were not selected as the "serving" or "transmitting" gNB-DU, but that have a connection to the UE). In the second blockage scenario, if a secondary gNB-DU gets blocked, the UE finds a new secondary gNB-DU. The UE and the gNB-DUs maintain a periodic (e.g., 20 ms) heartbeat signal to check connectivity.

Next, different aspects of the FIBR architecture, such as connectivity schemes, packet processing, and ring protection schemes, are described in §§ 4.1.2.1 through 4.1.2.3, respectively, below.

§ 4.1.2.1 Example Connectivity Schemes in FIBR

In this section, single-connectivity and multi-connectivity schemes are described in §§ 4.1.2.1.1 and 4.1.2.1.2, respectively.

§ 4.1.2.1.1 Single Connectivity Schemes

Under single connectivity, unless and until the channel quality between the gNB-DU and the UE degrades, the UE will be served by the same gNB-DU. Thus, at any given time, only one gNB-DU will have the UE address in its AFD. (Recall 1710 of FIG. 17.) As soon as a downlink packet arrives at a gNB-DU, the gNB-DU can perform different types of downlink packet processing. (Recall 1730 of FIG. 17.) The gNB-DU generally processes a downlink packet by performing a lookup action at its AFD to determine whether the gNB-DU serves the UE that the packet is destined to. If there is a match, the downlink packet may be processed in either of the following ways—the gNB-DU copies the packet into its downlink buffer (Recall 220 of FIG. 2), or the gNB-DU removes the packet from the ring and puts it into its downlink buffer. Each is described below.

In one example process, the gNB-DU copies the downlink packet into its downlink buffer. If no other packets are being served at that instant, the source gNB-DU frames the data and transmits it over the air interface. Otherwise, the packet is kept in the gNB-DU downlink bearer (e.g., data radio bearer, or DRB) buffer until there is a transmission opportunity. The packet will circulate the entire ring and return to the TA-GW, which will then remove it from the ring. Here, the TA-GW is a GW for a target area for packet processing and management. Thus, the TA-GW is the entry point on the ring. Once the gNB-DU receives an acknowledgement of the transmitted packets, it circulates the acknowledgement in the ring. Upon the reception of an acknowledgement, the gNB-CU at the TA-GW removes the associated packets from its PDCP buffer. If the packet is not acknowledged after a predetermined number of (e.g., 4) slots (assume a slot duration of 125 µs), the TA-GW will put the packet into the ring again. If it has not received the packet after another predetermined number of (e.g., 4) slots, the TA-GW will assume that an RLF occurred for the UE. In case of an RLF, the serving gNB-DU deletes the UE ID from its AFD. During RLF, downlink packets cannot be transmitted over the air, thus they will travel the ring once and will finally be removed by the TA-GW. When the UE establishes a connection with a new gNB-DU, the downlink packets can be forwarded again by the TA-GW. Thus, the packets will be removed from the PDCP buffer of the gNB-CU either after being acknowledged, or upon the expiration of a timer.

In another example process, the gNB-DU removes the packet from the ring and puts it into its downlink buffer. The packet is kept in the gNB-DU downlink buffer until there is a transmission opportunity. Once the gNB-DU receives an acknowledgement for the transmitted packets, it circulates the acknowledgement in the ring and the TA-GW can then remove the packet from its PDCP buffer. During RLF, the packets are no longer removed by the gNB-DU, but circulate the whole ring until they reach at the TA-GW. In this architecture option, if the TA-GW observes the same packets returning, it concludes that the UE is not connected to any gNB-DU. Thus, the TA-GW will not retransmit the packets unless and until the UE is connected with a new gNB-DU. The packets will be removed from the PDCP buffer of the gNB-CU either after being acknowledged, or upon the expiration of a timer.

In the uplink, traffic is transmitted over the air to the gNB-DU and waits in the gNB-DU uplink bearer buffer (Recall 260 of FIG. 2) before entering the ring. Once the uplink packets are injected into the ring, they will be forwarded to the 5G-CN by the TA-GW.

§ 4.1.2.1.2 Multi-Connectivity Schemes

Recall that in FIBR, which has fast control signaling among gNB-DUs, if a UE is capable of multi-connectivity, it maintains connectivity with multiple gNB-DUs, even though only a single gNB-DU (referred to as the "serving" or "transmitting" gNB-DU) transmits the data. Multi-connectivity with the other gNB-DUs may be maintained using heartbeat signals having a configured periodicity. In the multi-connectivity setting, multiple gNB-DUs can have the UE address in their AFD. The transmitting (or serving) gNB-DU is initially selected as the one with the highest RSSI value. Note that FIBR encourages the use of ephemeral links thanks to its fast switching ability. Two architecture design options are now described below with reference to FIGS. 18(a) and 18(b).

FIG. 18(a) is a flow diagram of a first example method 1730' for packet and handover processing given multi-connectivity, consistent with the present description. Different branches of the example method 1730' are performed in response to the occurrence of different events. (Event branch 1810) Responsive to receiving a downlink packet, the example method 1730' performed by each gNB-DU copies the downlink packet(s) into the gNB-Du's downlink bearer buffer. (Block 1820) Note that this is done by all of the gNB-DUs, regardless of whether or not they have been selected as the transmitter or server. If the gNB-DU running the example method 1730' is the one selected as the transmitter or server (Decision 1822=YES), it will transmit the buffered packet(s) to the UE when possible. (Block 1824) When the UE receives the transmitted packet(s), it will send back an acknowledgement. If a transmission acknowledgement is received from the UE (Decision 1830=UE), the example method 1730' circulates the received acknowledgement in the ring. (Block 1832) After a gNB-DU circulates the acknowledgement of a transmitted packet, all other gNB-DUs will receive the acknowledgement from the ring. (Decision 1830=RING) In this case, the example method 1730' will flush the acknowledged packet from their buffer since it has already been transmitted to the UE and acknowledge. (Block 1834) In this setting, gNB-DUs collectively try to achieve macro-diversity for high reliability. Finally, regarding HO, when the UE switches to one of the other gNB-DUs that it is connected to (i.e., when a new transmitting gNB-DU is selected), the new transmitting or serving gNB-DU (Decision 1840=YES) can start transmitting the downlink packets immediately, since these packets were already copied in its downlink buffer. (Block 1842) (Recall block 1820.) Processing of uplink packets is not shown in FIG. 18(a), but is described in § 4.1.2.2 below.

FIG. 18(b) is a flow diagram of a second example method 1730" for packet and handover processing given multi-connectivity, consistent with the present description. In this example method 1730", when a downlink packet is received, the transmitting or serving gNB-DU (i.e., the one selected for transmission) removes the packet from the ring and buffers it (Decision 1860=YES and Block 1862), but the other gNB-DUs do not copy the packet into their downlink buffer (Decision 1860=NO and Block 1866). Note that the serving gNB-DU transmits the buffered packets to the UE when possible. (Block 1864) When the serving gNB-DU receives a transmission acknowledgement back from the UE, it may then flush the acknowledged packets from its downlink buffer. (Block 1870) Note that this transmission acknowledgement need not be circulated to other gNB-DUs in the ring because they did not buffer the downlink packets, and therefore do not need to flush any buffered packets. In case of the UE switching the transmitting/serving gNB-DU (i.e., if another gNB-DU is selected for transmission), the new serving gNB-DU will forward a control signal into the ring indicating that it now serves the UE and the TA-GW can transmit into the ring the packets that have not yet been acknowledged. (Block 1880) Processing of uplink packets is not shown in FIG. 18(b), but is described in § 4.1.2.2 below.

§ 4.1.2.2 Example Packet Processing Schemes in FIBR

Example downlink and uplink packet processing in the ring are now described.

Figure 2:
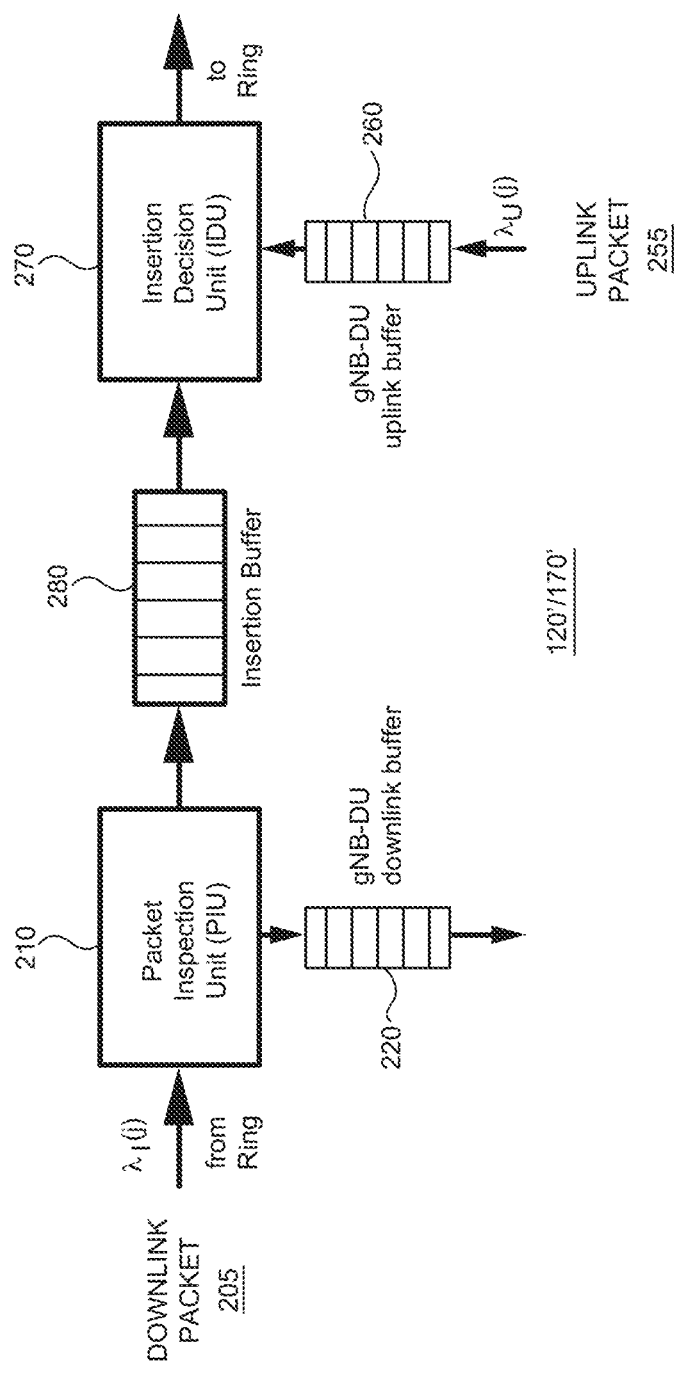

Downlink packet processing may be performed as follows. Referring to FIG. 2, at every ring node 120'/170', a packet inspection unit (PIU) 210 examines the header of every incoming packet 205 and copies the packet to the gNB-DU downlink buffer 220 if both (1) the destination UE is found in the gNB-DU's AFD, and (2) there is enough space in the gNB-DU downlink buffer 220. If one or both of these conditions are not satisfied, the packet will not be copied into the gNB-DU downlink buffer 220. Note that the gNB-DUs may maintain separate buffers for each UE and service class depending upon the 5G Quality Indicator (5GQI). (See, e.g., K. Pedersen, G. Pocovi, J. Steiner, and A. Maeder, "Agile 5G scheduler for improved E2E performance and flexibility for different network implementations," IEEE Commun. Mag., vol. 56, no. 3, pp. 210-217 (February 2018), incorporated herein by reference.)

Uplink packet processing may be performed as follows. Referring again to FIG. 2, when an uplink packet 255 is received at a gNB-DU node 120'/170', it is initially stored in the gNB-DU uplink buffer 260. During normal operation, packets are then extracted from the gNB-DU uplink bearer buffer 260 and put in the uplink ring. However, in the case of a single ring failure, the insertion decision unit (IDU) 270 decides whether packets from the ring (insertion buffer 280) or the gNB-DU uplink buffer 260 should be prioritized. The IDU 270 may be used to implement policies such that both uplink and downlink QoS can be satisfied in the case of a failure.

§ 4.1.2.3 Example Ring Protection Schemes in FIBR

To ensure the reliability of the ring in FIBR, 1+1 ring protection is considered. In other words, in the case that one ring fails, both the uplink and downlink packets will share a single ring. During normal ring operation (i.e., when there is no failure on either ring direction), uplink and downlink packet flows will (or at least may) be transmitted on separate rings. Note that the point-of-presence on the ring is only at the TA-GW. That is, every downlink packet originates from the TA-GW and every uplink packet terminates at the TA-GW in the ring. In the following, two failure scenarios—ring node failure and fiber cut failure—are considered.

After a ring node failure, the network operator will perform a wrap on the nodes adjacent to the failed one, and both uplink and downlink traffic will share the same ring. After a fiber cut failure, the network operator will perform a wrap on the two nodes adjacent to the fiber cut. In both failure scenarios, downlink and uplink traffic will eventually share the same directional ring. Thus, to handle a failure, every gNB-DU node in the ring is equipped with all the necessary functional blocks to process both uplink and downlink packets on the surviving ring. Referring again to FIG. 2, each gNB-DU node 120'/170' in the ring includes a packet inspection unit 210, an insertion buffer 280, and an insertion decision unit 270 for both uplink and downlink rings. During normal operations in the downlink ring, there is no uplink traffic. Therefore, the insertion decision unit 270 can remain disabled. Similarly, during normal operations in the uplink ring, there are no downlink packets. Thus, the packet inspection unit 210 can remain disabled.

A queueing analysis to compute the downlink and uplink packet latency considering 1+1 protection is presented in Appendix II. The queuing analysis presents an overview on the number of gNB-DUs that can be satisfied based on the ring capacity, the QoS requirements of different applications and services, and the 1+1 ring protection scheme.

§ 4.1.2.4 Complexity of the FIBR Transport Architecture

The main source of complexity associated with the example FIBR architecture consistent with the present description is related to the processing in the TA-GW and the remaining ring nodes. Recall that the TA-GW can host a gNB-CU. Thus, the complexity of the TA-GW is comparable with a gNB-CU that hosts PDCP and the layers above it. (See, e.g., CSTR-TN5G, "Transport network support of IMT-2020/5G," ITU-T, Tech. Rep. (February 2018) [Online]. Available: https://bit.ly/2HnxQM9, incorporated herein by reference.) The complexity of the other ring nodes is associated with the hardware processing capability. This hardware complexity is comparable to the complexity of nodes in ring architectures built in the past. (See, e.g., F. Alharbi and N. Ansari, "SSA: simple scheduling algorithm for resilient packet ring networks," IEE Proceedings-Communications, vol. 153, no. 2, pp. 183-188 (March 2006), incorporated herein by reference.)

§ 4.2 Handover (HO) Procedures in 3GPP and FIBR

This section presents recent advancements in the 3GPP HO procedure in § 4.2.1, and then describes the HO procedure in an example FIBR architecture consistent with the present description in § 4.2.2.

§ 4.2.1 3GPP HO Procedures

3GPP has discussed different HO procedures for both single-connectivity settings (See, e.g., 3GPP TS 38.401, 5G; NG-RAN; Architecture description, 3GPP Std. v15.2.0 (July 2018), incorporated herein by reference.) and multi-connectivity (See, e.g., 3GPP TS 37.340, Universal Mobile Telecommunications System (UMTS); LTE; 5G; NR; Multi-connectivity; Overall description; Stage2, 3GPP Std. v15.3.0 (September 2018), incorporated herein by reference.), settings. Note that in the multi-connectivity setting, 3GPP only considers multi-RAT DC. However, there are two major problems with multi-RAT DC. Firstly, eMBB services and some of the URLLC applications put a load on the network high enough so that a single LTE eNB cannot satisfy it. (See, e.g., D. H. Hagos and R. Kapitza, "Study on performance-centric offload strategies for LTE networks," in Proc. of IFIP WMNC (April 2013), incorporated herein by reference.) Thus, data plane traffic needs to be offloaded to multiple eNBs. Secondly, due to the intermittent connectivity of the mmWave channel, connectivity to only one extra gNB-DU cannot fulfill the reliability requirement. (See, e.g., I. K. Jain, R. Kumar, and S. Panwar, "The impact of mobile blockers on millimeter wave cellular systems," IEEE J. Sel. Areas Commun., vol. 37, no. 4, pp. 854-868 (February 2019), incorporated herein by reference.)

There are two types of HO procedures: (1) intra-gNB-CU HO, where UE traffic can be offloaded to a different gNB-DU, but it remains connected to the same gNB-CU, and (2) inter-gNB-CU HO, where UE traffic is offloaded to a completely different gNB using the Xn interface or 5G core entities. For comparisons within the framework of the example FIBR architecture consistent with the present description, only intra-gNB-CU HOs, which is expected to be far more frequent, will be compared with the proposed 3GPP intra-gNB-CU HO techniques. The inventors believe that in FIBR, inter-TA HOs will have similar complexity and performance as inter-gNB-CU HOs in the 3GPP transport architecture. Therefore, only intra-gNB-CU HO procedures are discussed here.

§ 4.2.1.1 Single Connectivity HO Procedures

Figure 3:
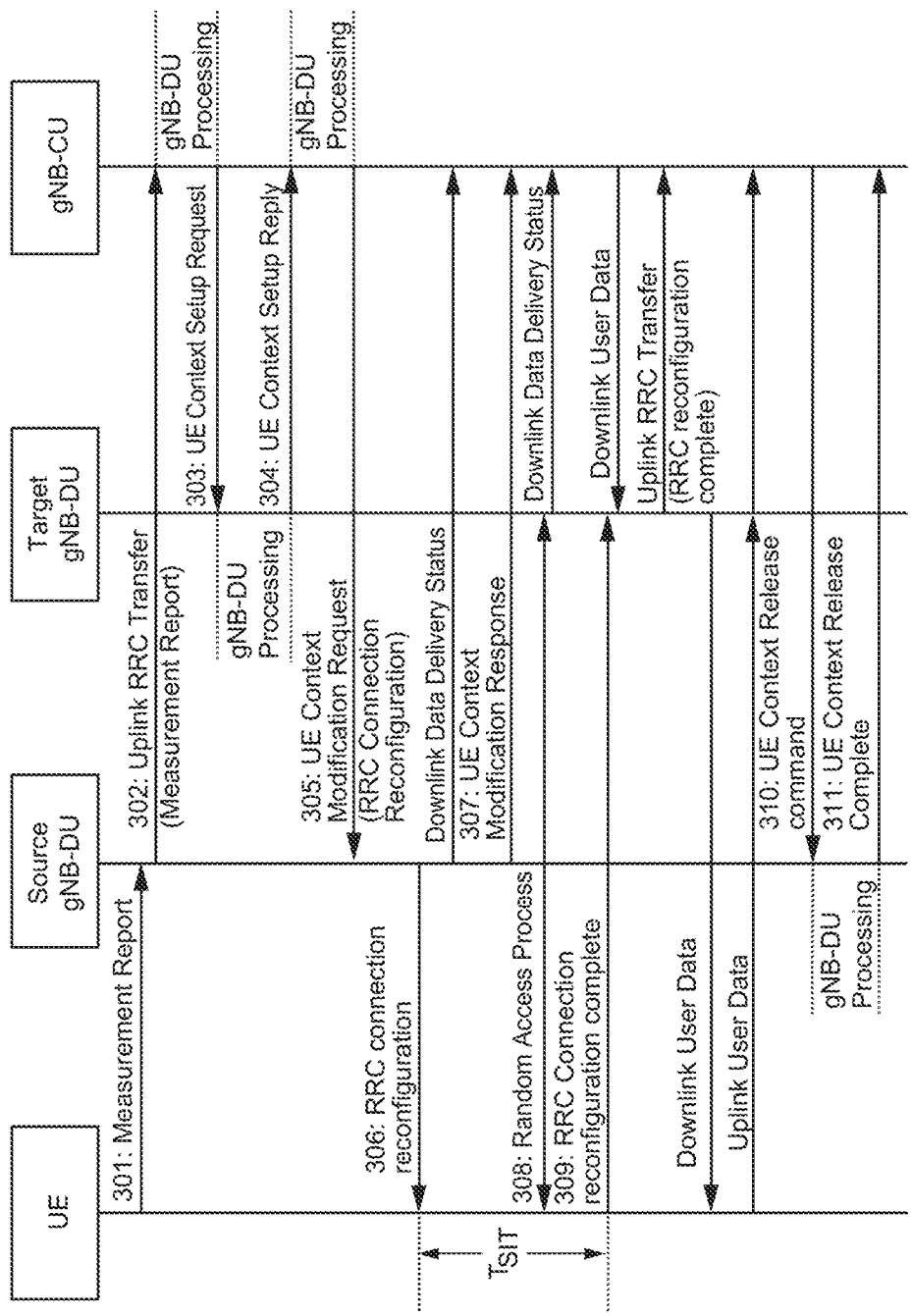

As the mmWave systems are prone to blockages and the cell sizes of gNB-DUs are smaller, intra-gNB-CU HOs will be more frequent as compared to the intra-LTE HOs (source and target cells belong to the same LTE network) in legacy LTE cellular systems. (See, e.g., the documents: I. K. Jain, R. Kumar, and S. Panwar, "The impact of mobile blockers on millimeter wave cellular systems," IEEE J. Sel. Areas Commun., vol. 37, no. 4, pp. 854-868 (February 2019), incorporated herein by reference; and H. Zhang, C. Jiang, J. Cheng, and V. C. Leung, "Cooperative interference mitigation and handover management for heterogeneous cloud small cell networks," IEEE Wireless Commun., vol. 22, no. 3, pp. 92-99 (July 2015), incorporated herein by reference.) The 3GPP intra-gNB-CU HO procedures and mobility (See, e.g., 3GPP TS 38.401, 5G; NG-RAN; Architecture description, 3GPP Std. v15.2.0 (July 2018), incorporated herein by reference.) management are presented in FIG. 3. The UE sends periodic measurement reports to the source gNB-DU (communication 301), which are forwarded to the gNB-CU for HO decision (communication 302). If the criteria of HO procedures are met, e.g., the Received Signal Strength Indicator (RSSI) value falls below the designated threshold, the gNB-CU initiates a HO procedure by sending the UE context setup information to the target gNB-DU (communication 303). After receiving the response from the target gNB-DU (communication 304), the gNB-CU sends the UE context modification request (communication 305), including an RRC connection reconfiguration request, to the source gNB-DU, and this RRC connection reconfirmation request is ultimately sent to the UE (communication 306). Following this, the source gNB-DU sends a downlink delivery status (communication 307) to the gNB-CU to indicate any unsuccessfully transmitted downlink data. Note that the PDCP layer in the gNB-CU keeps a copy of all packets until it receives a delivery status acknowledging successful transmission. Therefore, it is unnecessary to forward unacknowledged packets from the source gNB-DU to the target gNB-DU; the PDCP layer in the gNB-CU takes care of this. The UE follows a RACH procedure to establish a connection with the target gNB-DU (communication 308). After the completion of the RRC connection reconfiguration procedures, the UE notifies the target gNB-DU (communication 309). Data plane communication between the target gNB-DU and the UE can be initiated at this point and the UE context is then released from the source gNB-DU (communications 310 and 311).

Using the control signaling and processing at the UE, the source gNB-DU, the target gNB-DU and the gNB-CU, we compute the control plane latency $T_{CP}^{SgNBCU}$ as:

$$T_{CP}^{SgNBCU} = T_{gNBDU\text{-}UE} + 6T_{gNBDU\text{-}gNBCU} + T_{SIT} + 4T_{PgNB} \qquad (1)$$

where $T_{SIT}$ is the service or HO interruption time, $T_{A\text{-}B}$ is the propagation delay between nodes A and B, and $T_{PgNB}$ is the processing delay at the gNB. For the calculation of control plane latency, signaling and processing from communications 302-311 are considered, excluding communications 307-309 since time associated in communications 307-309 is considered in the service interruption time. In communications 307-309, the user plane can also be interrupted.

In the legacy HO procedures (break-before-make), as soon as the UE receives an RRC reconfiguration message (recall communication 306, it discontinues the data plane service. Although 3GPP has introduced MBB and RACH-less procedure for reducing data plane latency, the UE still has to follow control plane procedures in HO events. Thus, in scenarios where the source gNB-DU can be suddenly blocked, the data plane latency will be at least as much as the control plane latency.

Furthermore, note that due to the intermittent connectivity of mmWave links, RLFs may happen quite frequently. (RLF generally happens due to HO procedures and mobility) (See, e.g., H.-D. Bae, B. Ryu, and N.-H. Park, "Analysis of handover failures in LTE femtocell systems," in Proc. of IEEE ATNAC (November 2011), incorporated herein by reference.) In the RLF case, the UE needs to start RLF recovery procedures by either initiating an RRC connection reestablishment procedure (if it can connect to the previous serving BS), or cell search and RRC connection procedures. Note that both of these procedures may induce significantly higher control and user plane latency. In general, RLF is declared after the expiration of T310 and N310 timers (which are known LTE/5G NR timers), which corresponds to a latency of 30 ms. (See, e.g., LTE Quick Reference, "Radio link failure (RLF)," accessed: 2019 May 4. [Online]. Available: https://bit.ly/21zjNLb, incorporated herein by reference.)

§ 4.2.1.2 Multi-RAT DC HO Procedures

Many different multi-connectivity scenarios have been discussed in the documents: 3GPP TS 37.340, Universal Mobile Telecommunications System (UMTS); LTE; 5G; NR; Multi-connectivity; Overall description; Stage2, 3GPP Std. v15.3.0 (September 2018), incorporated herein by reference; and 3GPP TS 38.401, 5G; NG-RAN; Architecture description, 3GPP Std. v15.2.0, (July 2018) incorporated herein by reference, where the HO is handled by the LTE evolved packet core with the LTE Mobility Management Entity (MME) as the anchor point. The HO procedure using the 5G-CN is still under discussion in the 3GPP standard (Release 15). As of the current release of the standard, if a gNB-DU gets blocked, the connection to this gNB-DU is released and the LTE eNB starts serving the UE. Once a new gNB-DU is found, the connection to this gNB-DU is initiated. (See FIG. 4.) When a gNB-DU gets blocked, the 5G cellular systems may have to temporarily (until a new gNB-DU is found) stop services to high throughput applications due to limited resources.

Figure 4:
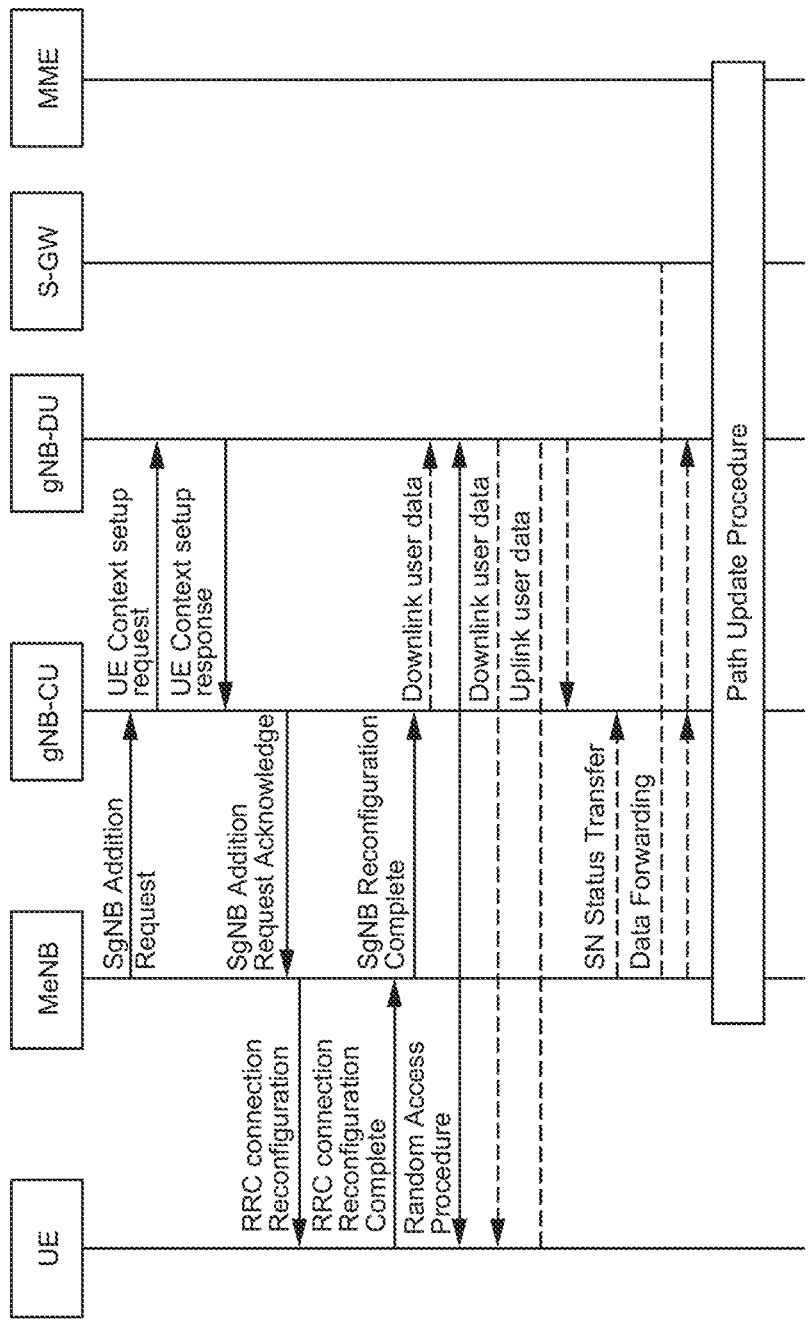

As shown in FIG. 4, in the case of dual connectivity under Release 15 of the 3GPP Standard, control plane functions are carried out by the LTE eNB (which makes eNB the master node and gNB the secondary node), thus increasing the connection reliability. However, this also limits the number of applications that can be offloaded to LTE eNB.

§ 4.2.2 HO Procedures in Example Embodiment of FIBR

Recall that in the example FIBR embodiment consistent with the present description, the connectivity between the gNB-CU and gNB-DUs is connectionless, while the connectivity between gNB-DUs and UEs is connection-oriented. Section 4.1.2.1 described both single connectivity and multi-connectivity in an example embodiment of FIBR, consistent with the present description, depending upon the UE capabilities to support them. The current section describes single connectivity and multi-connectivity in the context of HO for the FIBR architecture.

§ 4.2.2.1 Single Connectivity HO Procedures in FIBR

The example FIBR architecture focuses on user-centric networking to minimize HO latency. Based upon a measurement, a UE can send a switch request to its current serving gNB-DU. The serving gNB-DU sends this switch request onto the ring which includes all of the RRC and physical layer configuration parameters, and UE information. Note that since all of the gNB-DUs, and gNB-CUs are synchronized, there is no timing difference between gNB-DUs, and synchronization is not needed. Based upon measurements, the UE can indicate which gNB-DUs are the best candidate BSs. Upon the reception of the switch request, the candidate gNB-DUs check whether they can provide services to the UE using the previous RRC and physical layer configuration parameters. If they can, they send a switch response to the UE. The first gNB-DU to reach the UE via the switch response is (or at least may be) selected as the serving gNB-DU. Then, the UE replies to the gNB-DU with a switch acknowledgement. Upon the reception of the switch acknowledgment, the gNB-DU adds the UE address to its AFD. After adding the UE address to its AFD, the gNB-DU starts copying the UE downlink data from the ring.

In the case of sudden blockages, however, the UE may still need to follow similar procedures as in 3GPP transport architecture for RLF recovery. This can take a significantly long time. Therefore, multi-connectivity in FIBR is considered to achieve higher reliability.

§ 4.2.2.2 Multi-Connectivity and HO Procedures in FIBR

Figure 5:
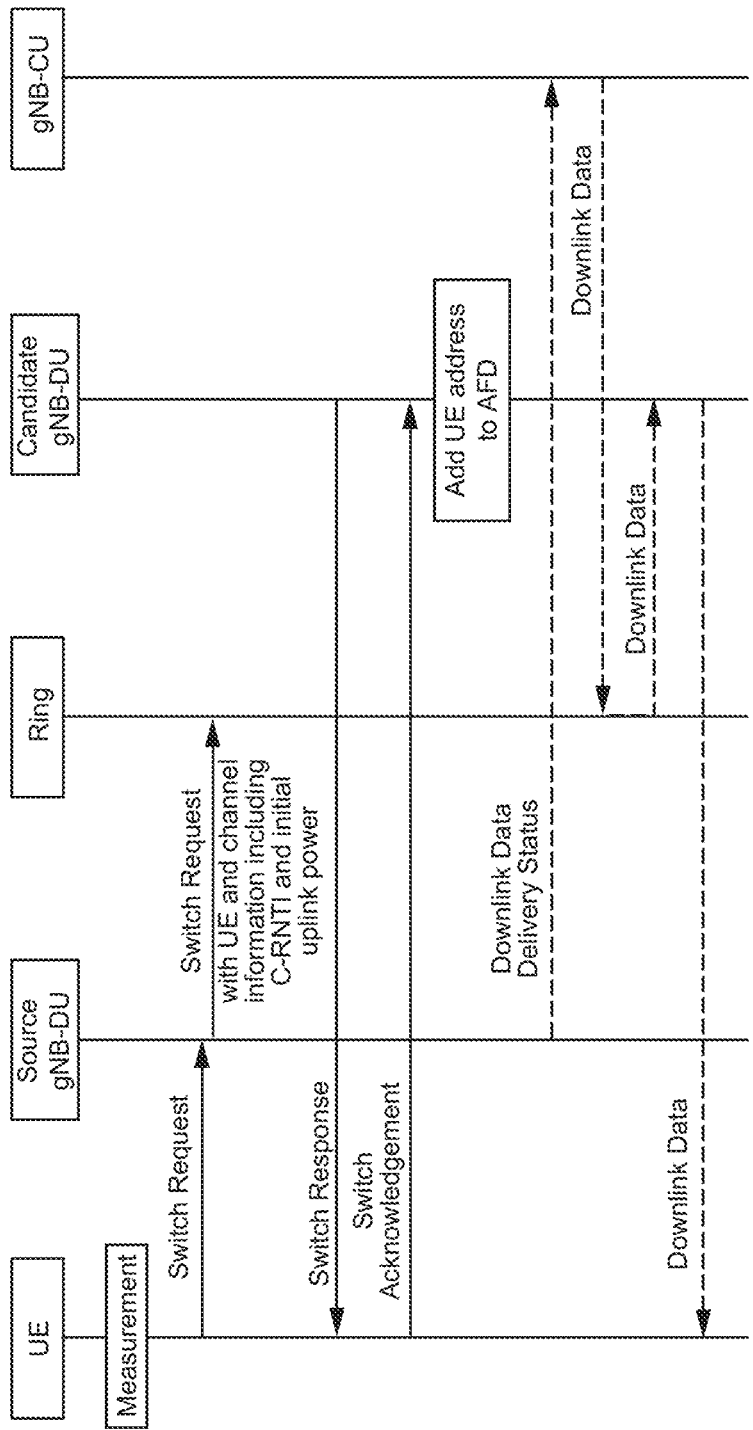
FIG. 5 illustrates single connectivity HO processes in an example implementation of FIBR.
Figure 6:
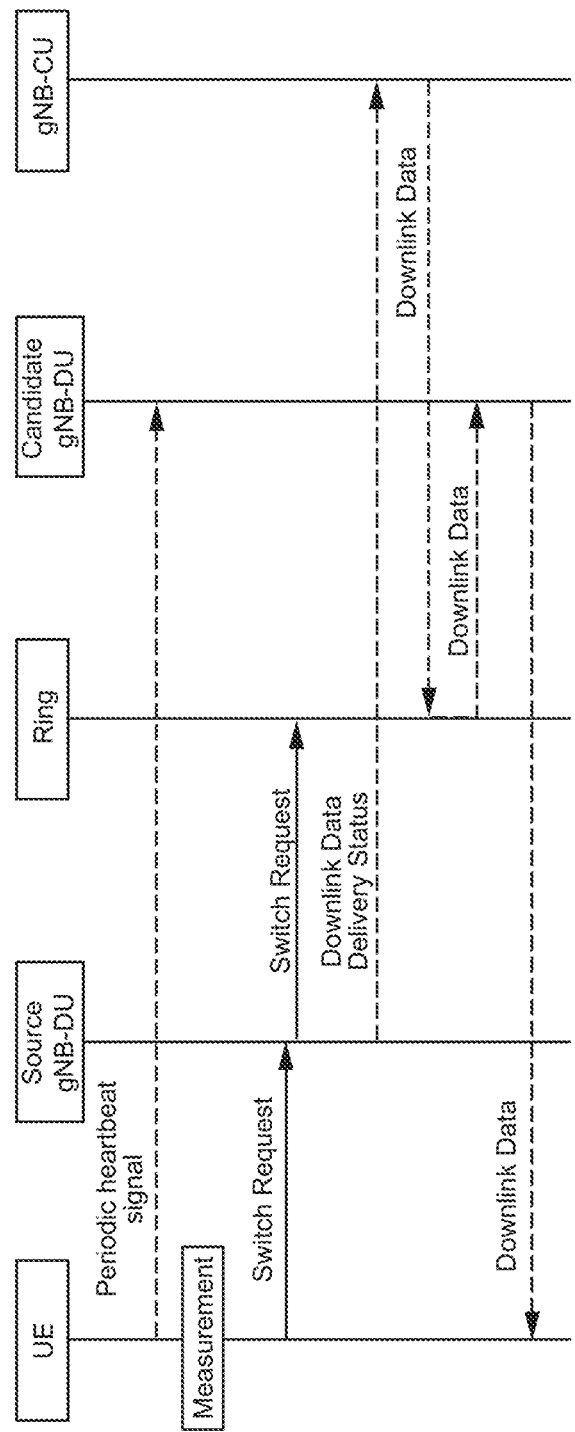
FIG. 6 illustrates multi-connectivity HO processes in an example implementation of FIBR.

In an example FIBR architecture consistent with the present description, a UE simultaneously maintains connections to multiple gNB-DUs for data transmission. However, as discussed earlier, although connectivity is maintained with multiple gNB-DUs, only a single gNB-DU sends traffic to the UE at any time. This was referred to as the "transmitting" or the "serving" gNB-DU. In the case of blockages, the UE switches to a secondary gNB-DU for services. The UE sends periodic heartbeat signals to the all other gNB-DUs to check connectivity. If a secondary gNB-DU gets blocked, it finds a replacement for the blocked secondary gNB-DU. The HO procedure for the example FIBR architecture in the multi-connectivity case is illustrated in FIG. 6. In the case of a secondary gNB-DU blockage, the HO procedure is similar to that illustrated in FIG. 5. Note that an RLF can still happen if all gNB-DUs having connectivity to the UE get blocked. However, this probability decreases significantly due to fast control signaling and multi-connectivity in the example FIBR architecture. In the case of an RLF, the UE will need to perform recovery processes similar to those discussed in the 3GPP standard.

The purpose of multi-connectivity in example FIBR architectures is to achieve high reliability instead of (or at least in addition to) obtaining high throughput like in legacy LTE networks. (See, e.g., A. Khlass, S. E. Elayoubi, and T. Bonald, "Multi-flow transmission and carrier aggregation inter-operation in HSPA+ advanced," in Proc. of IEEE VTC Fall (September 2014), incorporated herein by reference.) The example FIBR architecture provides a framework that removes the need for setting up and tearing down connections after blockage events. Thus, even if multiple BSs suffer simultaneous blockages, the example FIBR architecture can provide an alternative data path to transmit packets in uplink and/or downlink as long as at least one BS remains unblocked. This removes the control and data plane latency associated with RRC reconfiguration procedures. Occasionally, if a UE suffers blockages from all of its connecting BSs, an RLF will take place and the UE will start an RLF recovery process. However, as the example FIBR architecture uses multi-connectivity to alleviate the need for frequent HOs due to blockages, the number of RLF events will be significantly reduced. Therefore, the RLF probability in the example FIBR architecture is close to the simultaneous blockage rate for all connecting gNB-DUs.

§ 4.3 Numerical Results

This section compares an example FIBR transport architecture with the 3GPP transport architecture using MATLAB simulations. For the comparison of the two architectures, blockage and RLF probabilities, throughput, and data plane latency were considered. In the simulation, the UE is considered stationary at the origin and blockers are uniformly distributed at a radius of 100 m around the UE. For the blocker mobility, the random waypoint mobility model was used. (See, e.g., the documents: D. B. Johnson and D. A. Maltz, Dynamic Source Routing in Ad Hoc Wireless Networks (Boston, Mass.: Springer US 1996), pp. 153-181 (incorporated herein by reference); and M. Boutin, "Random waypoint mobility model," https://www.mathworks.com, accessed: 2019 Mar. 18 (incorporated herein by reference). The theoretical upper and lower bounds on blockage and RLF probabilities with the corresponding numerical results obtained via simulation are also compared.

The simulation considers a square of size 200 m×200 m, with blockers located uniformly in this area. The area of interest is a disc of radius R=100 m, which perfectly fits in the considered square area. The blockers choose a direction randomly, and move in that direction for a time-duration chosen uniformly in {0,60} seconds. The simulation included 5,000 runs, and each run consisted of the equivalent of 4 hours of blockers mobility. To maintain a fixed density of blockers in the square region, it was assumed that that once a blocker reaches the edge of the square area, it gets reflected. Note that the blockage duration was exponentially distributed with parameter $1/\mu=0.5$ seconds. Two values—9 and 12—were used as the number of gNB-DUs in the UE coverage area, and were uniformly distributed in a disc of radius R=100 m. Furthermore, four values—1, 2, 3, and 4—were used for the degree of connectivity. In both 3GPP and FIBR architectures, once blockage of the serving/master gNB-DU and the secondary gNB-DUs was detected, the UE performed an HO to other available unblocked gNB-DUs using MBB and synchronized RACH-less HO techniques. (See, e.g., S. Barbera, K. I. Pedersen, C. Rosa et al., "Synchronized RACH-less handover solution for LTE heterogeneous networks," in Proc. of IEEE ISWCS (August 2015), incorporated herein by reference. Thus, the HO latency was considered to be 0 ms as long as the UE can be served by at least one BS. An HO latency will be introduced in two scenarios: (1) the UE is completely blocked from all of the BSs; and (2) a new gNB-DU is not found during blockages. In such scenarios, the UE needs to start an RLF recovery procedure. Note that in the 3GPP transport architecture, blockages of secondary gNB-DUs can only be detected following periodic measurements while blockages of the serving gNB-DU blockage can be detected soon after it takes place. However, in the example FIBR implementation, both serving/master and secondary gNB-DUs can be detected rapidly thanks to the fast control signaling and the periodic heartbeat monitoring (with a short period) of secondary gNB-DUs. The rest of the parameters that were used in the simulation are presented in Table II.

TABLE II

| Simulation Parameters | |
| --- | --- |
| Parameters | Values |
| LOS Radius, R | 100 m |
| Velocity of Dynamic Blockers, V | 1 m/s |
| Height of Dynamic Blockers, hB | 1.8 m |
| Height of UE, hR | 1.4 m |
| Height of gNB-DU, hR | 5 m |

TABLE II-continued

| Simulation Parameters | |
| --- | --- |
| Parameters | Values |
| Expected blockage duration, $1/\mu$ | 0.5 s |
| Self-blockage angle, $\omega$ | 60° |

§ 4.3.1 Blockage and RLF Probabilities

FIGS. 7(a), 7(b), 8(a) and 8(b) plot blockage and RLF probabilities with different degrees of connectivity and numbers of gNB-DUs (i.e., 9 and 12) in the UE coverage region together with the corresponding theoretical lower and upper bounds. As discussed in Appendix I, the lower bound on the blockage and RLF probabilities will be obtained if the UE can switch to any gNB-DU in its coverage region without any HO latency. That is, the UE switches to an unblocked gNB-DU instantly during a blockage event. Thus, the UE has multi-connectivity effectively to all of the gNB-DUs in its coverage region. The theoretical upper bound in the K-connectivity setting can be obtained if the UE has only K gNB-DUs in its coverage region; if K gNB-DUs get blocked, the UE cannot find another available gNB-DU. From FIGS. 7(a) and 7(b), notice that when the UE cannot switch to a gNB-DU instantly and has a higher number of gNB-DUs in its coverage region compared to K (where K is degree of connectivity), the blockage probability lies between the two bounds. Similar observations are obtained from FIGS. 8(a) and 8(b) for the RLF probability.

From FIGS. 7(a) and 7(b), notice that the blockage probability decreases as the degree of connectivity increases. The highest improvement in the blockage probability can be observed when the degree of connectivity is increased from 1 to 2. In the single connectivity case, once the UE is blocked, it cannot search for another gNB-DU. In that case, RLF will only be avoided if the blockage duration is shorter than the T310 and N310 timers (30 ms). However, in the dual connectivity case, if one of the gNB-DUs gets blocked, the UE will be able to search for a new gNB-DU to replace the blocked one using its active connections and, as a result, the reliability is greatly increased. A higher degree of connectivity provides the UE with a higher degree of freedom to find unblocked gNB-DUs in its coverage region. However, if all gNB-DUs in the UE coverage area are blocked, having a higher degree of connectivity will not help. That is why the degree of connectivity higher than two results in decreasing improvement in blockage probability.

Comparing FIGS. 7(a) and 7(b), notice that if there is a significant number of gNB-DUs in the UE coverage region and if a reasonable degree of connectivity is available, the QoS requirements for URLLC applications can be met. In a scenario with a blocker density of 0.01 bl/m$^2$, the 3GPP architecture was able to achieve 99.9999% reliability with degree of connectivity equal to 4, when at least 9 gNB-DUs are in the UE coverage region. In the example FIBR embodiment, by contrast, a degree of connectivity of only 3 is required, which is a significant improvement given the additional overhead that a higher degree of connectivity imposes in the 3GPP architecture. (See, e.g., V. Petrov, D. Solomitckii, A. Samuylov, et al., "Dynamic multiconnectivity performance in ultra-dense urban mmwave deployments," IEEE J. Sel. Areas Commun., vol. 35, no. 9, pp. 2038-2055 (2017), incorporated herein by reference.) Furthermore, notice that FIBR achieves significantly lower blockage probability as compared to the 3GPP transport architecture due to its ability to perform fast signaling. Thus, it reduces the need for a very dense deployment of gNB-DUs, particularly in densely populated areas with high blocker densities. This could lead to significant cost savings.

Similar observations are obtained from FIGS. 8(*a*) and 8(*b*) for the RLF probability. Note that the blockage and RLF probabilities do not vary from each-other significantly, as an RLF will occur with high probability if a UE is blocked from all its serving gNB-DUs (the RLF timer of 30 ms is relatively small compared to the average blockage duration of 500 ms).

To further investigate the effect of a faster heartbeat signal, experiments with heartbeat signal periodicities of 5 ms and 1 ms were conducted. As shown in FIGS. 9(*a*) and 9(*b*), the RLF probability decreases significantly with a reduction in the heartbeat signal period. For a heartbeat signal periodicity of 1 ms, notice that the RLF probability converges to the theoretical lower bound for both blockage densities and number of gNB-DUs in the UE coverage area, for cases when the UE can support at least dual-connectivity. However, more frequent heartbeat signaling induces significant computational overhead in the UE and increased bandwidth utilization. Thus, the trade-off between the desired reliability and resources allocated to heartbeat signaling should be considered.

§ 4.3.2 Throughput

For the computation of throughput, an ON-OFF process was considered, in which during the blockages (when all serving/master and secondary gNB-DUs are blocked) throughput is 0 Mbps and in the unblocked duration throughput is obtained using an empirical path loss model. (See, e.g., the documents: T. Rappaport, Wireless Communications: Principles and Practice, 2nd ed. (Prentice Hall PTR, 2001), incorporated herein by reference; and G. R. MacCartney and T. S. Rappaport, "Rural macrocell path loss models for millimeter wave wireless communications," IEEE J. Sel. Areas Commun., vol. PP, no. 99, pp. 1-1 (2017), incorporated herein by reference.) Note that in the 3GPP transport architecture, the need for a handover to a new gNB-DU can be detected only through periodic measurement with a periodicity of 200 ms. [50] (See, e.g., 3GPP TS 36.133, LTE; Evolved Universal Terrestrial Radio Access (EUTRA); Requirements for support of radio resource management, 3GPP Std. v14.3.0 (April 2017), incorporated herein by reference.) Thus, to achieve high reliability, repetition coding is used in the 3GPP transport architecture. However, this will result in significant wastage of radio resources.

By contrast, in the example FIBR implementation, due to the fast control signaling among the BSs and heartbeat signaling (a periodicity of 20 ms is assumed) between the UE and the secondary/non-serving BSs, the blocked gNB-DU can be replaced with a new gNB-DU in a timely manner. This helps the example FIBR architecture to achieve high reliability without having to broadcast URLLC traffic over multiple gNB-DUs. Therefore, the example FIBR architecture improves the spectral efficiency and achieves a significantly higher throughput as compared to the 3GPP transport architecture. (See, e.g., FIG. 10.) Note that in the 3GPP transport architecture, the gNB-DU with highest signal-to-noise ratio to the UE is always selected, whereas in the example FIBR architecture, the gNB-DU is (or at least can be) selected randomly. Thus, in the single connectivity scenario, the 3GPP transport architecture achieves slightly higher throughput than the example FIBR architecture. Furthermore, in an example FIBR transport architecture with dense deployment of gNB-DUs (to achieve a high reliability) and random selection of gNB-DUs to avoid blockages, the obtained throughput may degrade slightly, as the selected gNB-DUs may be far from the UE. For example, in the example FIBR architecture, higher throughput is achieved when there are 9 gNB-DUs in the UE coverage region. (See, e.g., FIG. 10.) However, note that a higher number of gNB-DUs in the UE coverage region results in higher reliability that may be a key QoS metric for many URLLC applications. (Recall, e.g., FIGS. 7(*a*) and 7(*b*)).

§ 4.3.3 Data Plane Latency

As discussed earlier, in both 3GPP and an example FIBR implementation, MBB and synchronized RACH-less HO process are considered. Thus, the user plane latency during these HOs remains zero. However, the data plane connection can be interrupted if either (A) all gNB-DUs connected to the UE get blocked, or (B) all gNB-DUs in the UE coverage region get blocked. In the first scenario (if all gNB-DUs connected to the UE get blocked), RLF will be declared and an RLF recovery process will be initiated. If the RLF recovery process succeeds, the data plane services can be re-established. In the second scenario (if all gNB-DUs in the UE coverage region get blocked), in the event of simultaneous blockage of all connected gNB-DUs, the UE will initiate an RLF recovery process. If all other gNB-DUs in the UE coverage region are also blocked, then the RLF recovery process may fail resulting in a long data plane interruption unless and until one of the gNB-DU in UE coverage region gets unblocked.

Regarding data plane latency, the above two blockage scenarios were considered in simulations. From FIG. 11, notice that the data plane latency decreases significantly with the degree of connectivity and the number of gNB-DUs in the UE coverage region. Furthermore, the FIBR architecture only modestly outperforms the 3GPP architecture. Two important points must be noted, however. First, the data plane latency is actually dominated by the outage duration; not the HO duration. That is, even if there is a scheme with 0 ms HO delay, the expected data plane latency will remain higher than 55 ins and 42 ms when there are 9 and 12 gNB-DUs in the UE coverage range, respectively. (See, e.g., I. K. Jain, R. Kumar, and S. Panwar, "The impact of mobile blockers on millimeter wave cellular systems," IEEE J. Sel. Areas Commun., vol. 37, no. 4, pp. 854-868 (February 2019), incorporated herein by reference.) Therefore, the faster HO that FIBR offers only leads to a modest improvement over the 3GPP approach. Second, referring back to FIGS. 8(*a*) and 8(*b*), notice that the RLF probabilities are much lower for FIBR. Consequently, the data plane delays will occur less frequently for the example FIBR implementation than 3GPP. URLLC applications may tolerate such delays if they are sufficiently infrequent (e.g., they occur with probability $10^{-6}$).

§ 4.4 Example Apparatus

Embodiments consistent with the present invention may be implemented on an example system 1600 as illustrated on FIG. 16. FIG. 16 is a block diagram of an exemplary machine 1600 that may perform one or more of the processes described, and/or store information used and/or generated by such processes. The exemplary machine 1600 includes one or more processors 1610, one or more input/output interface units 1630, one or more storage devices 1620, and one or more system buses and/or networks 1640 for facilitating the communication of information among the coupled elements. One or more input devices 1632 and one or more output devices 1634 may be coupled with the one or more input/output interfaces 1630. The one or more processors 1610 may execute machine-executable instructions (e.g., C or C++ running on the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1620 and/or may be received from an external source via one or more input interface units 1630. The machine executable instructions may be stored as various software modules, each module performing one or more operations. Functional software modules are examples of components of the invention.

In some embodiments consistent with the present invention, the processors 1610 may be one or more microprocessors and/or ASICs. The bus 1640 may include a system bus. The storage devices 1620 may include system memory, such as read only memory (ROM) and/or random access memory (RAM). The storage devices 1620 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present invention may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present invention may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present invention might be implemented in hardware, such as one or more field programmable gate arrays ("FPGA"s), one or more integrated circuits such as ASICs, one or more network processors, etc. Alternatively, or in addition, embodiments consistent with the present invention might be implemented as stored program instructions executed by a processor. Such hardware and/or software might be provided in a laptop computer, desktop computer, a server, a tablet computer, a mobile phone, or any device that has computing capabilities and that can perform the foregoing method(s).

§ 4.5 Refinements, Extensions, and/or Alternatives

Although example implementations of FIBR were described in the context of 5G networks, they can be applied to other mm Wave and/or Terahertz cellular networks. Further, they can be applied to any blockage-driven cellular networks resulting in frequent handovers.

§ 4.6 Conclusions 5G mmWave cellular networks are expected to meet the QoS requirements of different applications and services. These applications and services not only require high throughput but also impose significant challenges on the network in terms of latency and reliability. Although mmWave links can achieve data rates as high as a few Gbps, they are highly intermittent in nature causing frequent HOs. Since the 3GPP transport architecture is connection-oriented, where a connection is set up and torn down during every HO procedure, meeting the latency and reliability of URLLC applications is challenging. To satisfy the QoS requirements of different applications and services, primarily URLLC and eMBB, example FIBR embodiments are described. These describe a new transport network architecture for mm Wave and/or Terahertz cellular networks (e.g., 5G networks) that reduces signaling overhead and simplifies network protocols. In example FIBR embodiments consistent with the present description, a number of BSs in close proximity are grouped together to form a bi-directional buffer insertion ring network. In the example FIBR transport architecture, the UEs are connected to the core network without regard as to which BS on the ring the UE is associated with at a given instant, providing an efficient framework for multi-connectivity.

The performance of an example FIBR implementation was compared with the new 3GPP transport network architecture using a MATLAB simulation. The results of these simulations demonstrated that since FIBR achieves superfast control signaling between BSs, it reduces probability of UE blockage, the probability of RLF, and data plane latency. The capability of example FIBR embodiments consistent with the present description to achieve fast and reliable HOs enables the air interface to effectively utilize ephemeral and less reliable links. Thus, example FIBR transport architectures consistent with the present description improve the performance of URLLC and eMBB applications in an environment with frequent HOs.

APPENDIX I

A. Blockage Probability

To compute the Line-of-Sight (LOS) blockage probability of gNB-DUs, we used the expression developed in our previous work. (See, e.g., I. K. Jain, R. Kumar, and S. Panwar, "The impact of mobile blockers on millimeter wave cellular systems," IEEE J. Sel. Areas Commun., vol. 37, no. 4, pp. 854-868 (February 2019), incorporated herein by reference.) To determine the RLF probability, we will first briefly review some the expressions for blockage probability derived in our previous paper. (See, e.g., I. K. Jain, R. Kumar, and S. Panwar, "The impact of mobile blockers on millimeter wave cellular systems," IEEE J. Sel. Areas Commun., vol. 37, no. 4, pp. 854-868 (February 2019), incorporated herein by reference.) First, let us consider blockages due to dynamic blockers. Let us also consider the link between the UE and the source gNB-DU ($i^{th}$ gNB-DU in the UE coverage area). (See FIG. 12.) Then the dynamic blockage rate $\alpha_i$ of this link is computed as:

$$\alpha_i = \frac{2}{\pi}\lambda_B r_i^{eff} V = \frac{2}{\pi}\lambda_B V \frac{(h_B - h_R)}{(h_T - h_R)} r_i = C r_i, \qquad (2)$$

where C is:

$$C = \frac{2}{\pi}\lambda_B V \frac{(h_B - h_R)}{(h_T - h_R)}, \qquad (3)$$

$\lambda_B$ is the dynamic blockers density, V is the speed of dynamic blockers, $h_B$ is the height of blockers, $h_R$ is the height of the UE, and $h_T$ is the height of the transmitter. A detailed derivation of (2) can be found in the document I. K. Jain, R. Kumar, and S. Panwar, "The impact of mobile blockers on millimeter wave cellular systems," IEEE J. Sel. Areas Commun., vol. 37, no. 4, pp. 854-868 (February 2019), incorporated herein by reference.

Considering an ON-OFF process with α, (exponentially distributed blocked interval) and μ (exponentially distributed unblocked interval), the blockage probability $P(B_i^d|m, r_i)$ of the link between the source gNB-DU and the UE can be written as:

$$P(B_i^d \mid m, r_i) = \frac{\alpha_i}{\alpha_i + \mu} = \frac{\frac{C}{\mu} r_i}{1 + \frac{C}{\mu} r_i}, \; \forall \, i = 1, \ldots, m, \tag{4}$$

Let us assume K denotes the set of K gNB-DUs in the K-connectivity scenario. That is, K is the set of K gNB-DUs to which the UE is simultaneously connected. Note that K gNB-DUs are randomly selected among M gNB-DUs in the UE coverage area. Due to mathematical complexity, we choose to find the upper and lower bound of the blockage probability in the K-connectivity setting. Note that an upper bound on the blockage probability in the K connectivity setting will be obtained if there is a fixed K number of gNB-DUs in the UE coverage area. Furthermore, a lower bound on the blockage probability (M>K) will be obtained if the UE can perform HO to other gNB-DUs in its coverage area with a zero HO duration. In the K-connectivity scenario, assuming independent blockages of gNB-DUs, the probability of simultaneous blockage $P(B_i^d|K,r_i)$ of all of the K gNB-DUs connected to a UE can be written as:

$$P(B^d \mid K, r_k) = \prod_{k \in K} \frac{\frac{C}{\mu} r_k}{1 + \frac{C}{\mu} r_k}, \tag{5}$$

where the number of gNB-DUs m in the UE coverage follows the homogeneous Poisson Point Process BSs model in the document I. K. Jain, R. Kumar, and S. Panwar, "The impact of mobile blockers on millimeter wave cellular systems," IEEE J. Sel. Areas Commun., vol. 37, no. 4, pp. 854-868 (February 2019), incorporated herein by reference, given by:

$$P_M(m) = \frac{|p\lambda_T \pi R^2|^m}{m!} e^{-p\lambda_T \pi R^2}, \tag{6}$$

where for a self-blockage angle ω, the probability of self-blockage $P(B^{self})$ is computed in the document, I. K. Jain, R. Kumar, and S. Panwar, "The impact of mobile blockers on millimeter wave cellular systems," IEEE J. Sel. Areas Commun., vol. 37, no. 4, pp. 854-868 (February 2019), incorporated herein by reference, as:

$$P(B^{self}) = \frac{\omega}{2\pi}, \tag{7}$$

Assuming the independence of dynamic blockage and self-blockage, the blockage probability of the link between the UE and the $k^{th}$ gNB-DU in the K-Connectivity setting can be written as:

$$P(B_k^{LOS}|K,r_k) = 1 - (1 - P(B^{self}))(1 - P(B_i^d|K,r_k)) \tag{8}$$

Using (4), (7), and (8), the blockage probability of a link between the UE and the $k^{th}$, $\forall k \in k_{gNB-DU}$ can be simplified as:

$$P(B_k^{LOS} \mid K, r_k) = 1 - p \frac{1}{1 + \frac{C}{\mu} r_k}; \; \forall \, k \in K. \tag{9}$$

Thus, the upper-bound on the LOS blockage probability given K-connectivity $P(B^{LOS}|K)$ can be obtained by taking the average of $P(B^{LOS}|K,r_k)$ over the distribution of distances $r_k$. As K gNB-DUs are randomly selected from the M available gNB-DUs and the UE does not differentiate among the gNB-DUs in the UE coverage area, the distance distribution of gNB-DUs connected to the UE follows the same distance distribution as gNB-DUs in the UE coverage area. Thus, the blockage probability $P(B^{LOS}|K)$ in K-connectivity setting is computed as:

$$P(B^{LOS} \mid K) = \int_{r_1} \cdots \int_{r_K} \prod_{k \in K} P(B_k^{LOS} \mid K, r_k) f(r_k) dr_1 \ldots dr_K \tag{10}$$

$$= \int_{r_1} \cdots \int_{r_K} \prod_{i \in K} \left(1 - p \frac{1}{1 + \frac{C}{\mu} r_k}\right) f(r_k) \times dr_1 \ldots dr_K$$

$$= \left(\int_{r=0}^{R} \left(1 - p \frac{1}{1 + \frac{C}{\mu} r}\right) \frac{2r}{R^2} dr\right)^K$$

$$= \left(1 - p \int_{r=0}^{R} \frac{1}{1 + \frac{C}{\mu} r} \frac{2r}{R^2} dr\right)^K$$

$$= \left(1 - \frac{2p\mu}{C^2 R^2} \left(CR - \mu \ln\left(1 + \frac{C}{\mu} R\right)\right)\right)^K.$$

Following the previous discussion about the lower-bound on the LOS blockage probability, we can write the blockage probability as:

$$P(B^{LOS} \mid k) = \left(1 - \frac{2p\mu}{C^2 R^2}\left(CR - \mu \ln\left(1 + \frac{C}{\mu} R\right)\right)\right)^M, \; \forall \, k \in K. \tag{11}$$

Furthermore, note that K-connectivity can be achieved if, and only if, there are at least K gNB-DUs in the UE coverage area. Otherwise, if the gNB-DUs density is significantly low, we simply argue that a higher degree of connectivity cannot be achieved. If there are at least K gNB-DUs in the UE coverage area, then the blockage probability in K-connectivity setting is expressed by (10). The probability $P(C_K)$ of having at least K gNB-DUs in the UE coverage area is given by:

$$P(C_K) = \sum_{m=K}^{\infty} P_M(m) \tag{12}$$

$$= \sum_{m=K}^{\infty} \frac{|pq\lambda_T \pi R^2|^m}{m!} e^{-pq\lambda_T \pi R^2}$$

FIG. 13 shows P ($C_K$) for different gNB-DU density values. Note that for a smaller gNB-DU density, a high degree of multi-connectivity is more difficult to achieve.

B. RLF Probability

Let us now consider the scenario that a blockage event leads to an RLF. In general, an RLF is declared upon the expiration of the N310 timer and the T310 timer, together accounting for around 30 ms. On the expiration of these timers, an RLF is declared by the UE and the UE initiates an RLF recovery process. Thus, if the blockage duration is larger than 30 ms, an RLF will occur. Let us assume the blockage duration is TB, then the probability of RLF failure can be written as:

$$P(RLF) = P(B^{LOS}|K, T_B|K > 30) \tag{13}$$

$$= P(B^{LOS}|K)P(T_B|K > 30).$$

Note that for simplicity we assume that blockage duration does not depend upon the probability of the blockages. The probability that the blockage duration is greater than 30 ms is:

$$P(T_B > 30 \mid K) = \int_{30}^{\infty} m\mu e^{-K\mu t} dt \tag{14}$$

$$= e^{-30K\mu}$$

Therefore, using (10), (13) and (14), the RLF probability can be derived as:

$$P(RLF) = (1-ap)^K e^{-30K\mu}. \tag{15}$$

APPENDIX II

C. Queueing Analysis of FIBR

A crucial design issue is the sizing of the ring capacity to meet the bandwidth and delay QoS needs for the UEs covered by one TA-GW. The traffic on the ring will vary with the traffic on the uplink and downlink of a group of UEs. It is important to ensure that the ring can accommodate this varying traffic and deliver it within a tight time bound. We therefore present an analysis of the uplink and downlink queueing delay in FIBR for the worst case; when both uplink and downlink traffic share a single ring after a failure. (See FIG. 2.) We only consider queueing delay in our analysis. Apart from the queueing delay, other delays such as propagation (5 μs assuming a ring length of 1 km) and transmission delay (12 μs for 100 nodes in the ring assuming a packet size of 1500 bytes) remain quite low as compared to the delay requirements of URLLC applications. We therefore do not focus on them in our analysis. We model this system, which consists of these two buffers, as a prioritized non-preemptive head-of-the-line queue. (See, e.g., L. Kleinrock, Queueing systems, vol. 1 (Wiley, New York, 1975), incorporated herein by reference.) For a first-order evaluation of the system, we assume that the packet arrivals are Poisson distributed and that their service times are exponentially distributed, i.e., the queue discipline at the insertion buffers is M/M/1.

We assume that there are L ring nodes in the TA and index them according to closeness to the TA-GW (assume that the index of TA-GW is j=1), i.e., downlink traffic will first reach the ring node with index j=2, and completes a full circle with the ring node with index j=L. Let us define the packet arrival rates at the gNB-DU uplink and insertion buffer of the ring node j by $\lambda_U(j)$ and $\lambda_I(j)$ respectively, $1/\mu$ is the mean packet size (bits/packet) and C is the FIBR capacity (bits/sec). The utilization factors $\rho_U(j)$ and $\rho_I(j)$ of the gNB-DU uplink and insertion buffer are calculated as follows:

$$\rho_U(j) = \lambda_U(j)/(\mu C), \tag{16}$$

$$\rho_I(j) = \lambda_I(j)/(\mu C). \tag{17}$$

The packet priorities can heavily affect the delays in the two queues. Let us consider two different priority options:

a) Ring priority, where packets in the insertion buffer are transmitted before those in the gNB-DU uplink buffer, and b) gNB-DU priority, where packets in the gNB-DU uplink buffer are prioritized over those in the insertion buffer. To prevent overflow, we simplify the analysis by assuming that both buffers are sufficiently large.

The waiting time in the insertion buffer of ring node j for the ring and gNB-DU priorities are, respectively, $$W_I^{Ring}(j) = \frac{R}{1 - \rho_I(j)}. \tag{18}$$

$$W_I^{gNB-DU}(j) = \frac{R}{(1 - \rho_U(j))(1 - \rho_I(j) - \rho_U(j))}. \tag{19}$$

where R is the mean residual service time of packets being serviced upon arrival, and is given by $$R(\rho_I(j) + \rho_U(j))/(\mu C). \tag{20}$$

(See, e.g., L. Kleinrock, Queueing systems, vol. 1 (Wiley, New York, 1975), incorporated herein by reference.)

Similarly, the waiting time in the gNB-DU uplink buffer of ring node j for ring and gNB-DU priority are, respectively, $$W_U^{Ring}(j) = \frac{R}{(1 - \rho_I(j))(1 - \rho_I(j) - \rho_U(j))}, \text{ and} \tag{21}$$

$$W_I^{gNB-DU}(j) = \frac{R}{1 - \rho_U(j)}. \tag{22}$$

1) Downlink Traffic: We model the queue in the gNB-DU downlink bearer buffer as an M/M/1/N queue. We select the gNB-DU downlink buffer length N (in packets) to be equal to a fixed multiple of the product of the 5G slot duration (in seconds) and the gNB-DU downlink bandwidth. We select a buffer size several times higher than the product of the slot duration and the gNB-DU downlink bandwidth to ensure that minimum latency can be achieved without link starvation. In the 5G cellular systems, the slot duration is defined as 125 μs for URLLC applications. (See, e.g., 3GPP TS 38.211, 5G; NR; Physical channels and modulation, 3GPP Std. v15.2.0 (July 2018), incorporated herein by reference.)

$$N = T_{frame} \times BW_{gNB-DU}. \tag{23}$$

The waiting time $W_{gNB-DU}^{DL}$ for the aforementioned queueing system is obtained. (See, e.g., J. L. van den Berg and O. J. Boxma, "The M/G/1 queue with processor sharing and its relation to a feedback queue," Queueing Systems, vol. 9, no. 4, pp. 365-401 (December 1991), incorporated herein by reference.) Thus, the downlink delay $W_{DL}(j)$ for a packet destined to a UE associated with gNB-DU j is computed as the sum of the delays in the insertion buffers, until the previous ring node, and the current gNB-DU downlink queueing delay:

$$W_{DL}^{(P)}(j) = \sum_{k=0}^{j-1} W_I^{(P)}(k) + W_{gNB-DU}^{DL}(j), \qquad (24)$$

where P is the priority used at a ring node. Note that in the bidirectional downlink ring, no packet enters the ring from the gNB-DU, thus only ring priority is considered during normal operation. However, one of the discussed ring priorities can be considered in case that a ring fails. Note that the waiting time $W_{gNB-Du}^{DL}$ in the downlink bearer buffer includes both head-of-line processing delay and scheduling delay.

D. Uplink Traffic

The total queueing delay $W_{UL}(j)$ for an uplink packet in the ring node entering the gNB-DU j is:

$$W_{UL}^{(P)}(j) = \sum_{k=j+1}^{L} W_I^{(P)}(k) + W_U^{(P)}(j), \qquad (25)$$

where P is the priority used at a ring node and j is the gNB-DU node from which uplink traffic is inserted into the ring. Similar to previous discussion, the waiting time $W_U^{(P)}(j)$ in the uplink bearer buffer includes both head-of-line processing delay and uplink scheduling delay. The uplink scheduling delay for URLLC applications is computed as 632 µs by considering delay associated with the uplink transmission grant and its processing. (See, e.g., 3GPP R1-1701612, Facilitating eMBB/URLLC UL Multiplexing with the zero-wait-time Scheduling Request Underlay Channel, 3GPP RAN1 #88, 3GPP Std. (February 2017), incorporated herein by reference.)

Note that the performance of FIBR is limited by two determining factors, (i) the protection mechanism: we consider 1+1 protection of the ring, and (ii) the QoS agreement: maximize the utilization at the gNB-DUs while satisfying the QoS requirements of URLLC applications. In our analysis, we consider a ring capacity of 400 Gbps (See, e.g., Accton Making Partnership Work, "The new world of 400 Gbps Ethernet." [Online]. Available: https://bit.ly/2QabYqH, incorporated herein by reference.) and the service rate at each gNB-DU to be 3 Gbps (See, e.g., Z. Pi and F. Khan, "An introduction to millimeter-wave mobile broadband systems," IEEE Commun. Mag., vol. 49, no. 6, pp. 101-107 (June 2011), incorporated herein by reference.). Furthermore, we assume uplink traffic to be one fourth of the downlink traffic, as predicted by the International Telecommunication Union. (See, e.g., ITU-R, "IMT traffic estimates for the years 2020 to 2030," ITU, Tech. Rep. M.2370-0 (July 2015), incorporated herein by reference.) Thus, the average uplink load is 750 Mbps at every gNB-DU. We first examine the failure scenario to evaluate the maximum number of gNB-DUs that can be supported in FIBR considering 1+1 protection, the QoS requirements of URLLC applications, stability of the FIBR, and utilization of gNB-DUs and ring.

Figure 15B:
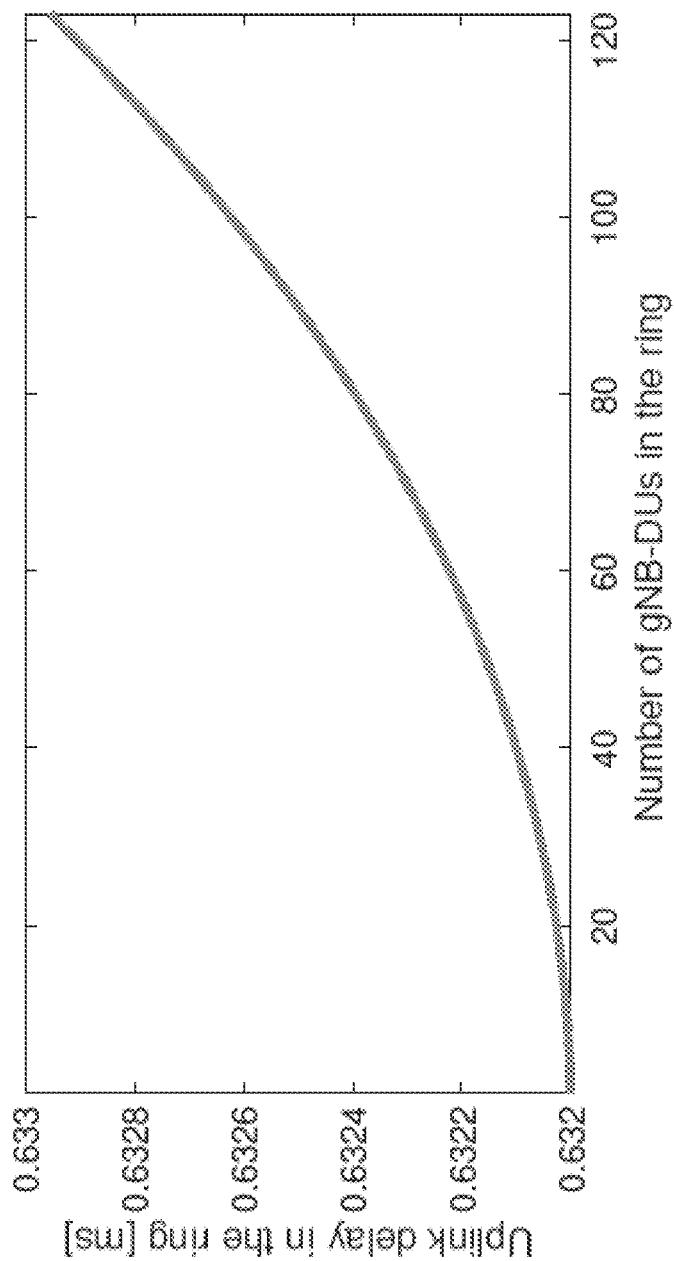

FIGS. 14(a)-14(d) represent the uplink and downlink queueing delay in FIBR when one of the rings fail. For the considered parameters of ring capacity and service rate at gNB-DUs, we compute that around 120 gNB-DUs can be supported by the ring. From FIGS. 14(a)-14(d), we observe that the uplink and downlink delay increases with the number of gNB-DUs and their utilization. We can observe from FIGS. 14(c) and 14(d) that uplink delay may be significantly higher for ring priority as compared to gNB-DU priority in FIBR. This happens as insertion queues at each gNB-DU are in general multiple times larger than uplink queues, thus prioritizing packets of insertion queues leads to additional delay for uplink packets. By contrast, prioritizing uplink packets induces additional delay to downlink packets, but this delay increment is marginal. (See FIGS. 14(a) and 14(b).) Thus, when the ring fails, gNB-DU priority is the natural choice. During the normal operation of FIBR, as downlink and uplink traffic are separated in different rings, we have ring priority in the ring handling the downlink traffic and gNB-DU priority in the ring handling the uplink traffic. FIGS. 15(a) and 15(b) plot the downlink and uplink delay in the FIBR during normal operation. As shown in FIGS. 15(a) and 15(b)), we obtain lower uplink and downlink delays as they are carried over two separate rings.

What is claimed is:

1. A computer-implemented method comprising:
  a) grouping a plurality of distributed units of a base station (DUBS) in a target area (TA) to form a ring network, wherein the ring network further includes a centralized unit of the base station (CUBS);
  b) responsive to a mobile user equipment (UE), entering the TA, conducting, by the UE, a search procedure to find any available DUBSs of the ring network with which the UE can communicate mobile data at a predetermined acceptable level;
  c) discovering by the UE, the available DUBSs with which it can communicate mobile data;
  d) selecting, a plurality of the available DUBSs;
  e) submitting a request, by the UE, for the plurality of selected available DUBSs to serve as an access point for the UE on the ring network;
  f) accepting, by each of the plurality of selected available DUBSs, the request and adding, by each of the plurality of selected available DUBSs, an identifier of the UE (UE ID) to an address filter database (AFD); and
  g) receiving or determining, by the UE, channel state information with each of the plurality of selected available DUBSs.

2. The computer-implemented method of claim 1 further comprising:
  h) selecting, from among the plurality of selected available DUBSs, a primary serving DUBS; and
  i) maintaining
    1) A control path for connectivity between the UE and the primary service DUBS, and
    2) a wireless data transmission path between the UE and each of the plurality of selected available DUBSs.

3. The computer-implemented method of claim 2 further comprising:
  j) receiving a downlink packet by one of the plurality of DUBSs;
  k) responsive to receiving the downlink packet, performing, by the one of the plurality of DUBSs, a lookup in its AFD to determine whether or not it serves the UE to which the packet is destined;

l) Responsive to determining, by the one of the plurality of DUBSs, that it serves the UE to which the packet is destined, copying the packet to a downlink buffer for wireless transmission to the UE, and otherwise, responsive to determining, by the one of the plurality of DUBSs, that it does not serve the UE to which the packet is destined, advancing the received packet to a next DUBS in the ring network.

4. The computer-implemented method of claim 3 further comprising:
m) receiving, by the one of the plurality of selected available DUBSs, an acknowledgement of receipt by the UE of the transmitted packet; and
n) responsive to receiving the acknowledgement, removing, by the one of the plurality of selected available DUBSs, the packet from its downlink buffer.

5. The computer-implemented method of claim 3 further comprising:
m) determining, by the one of the plurality of selected available DUBSs, whether or not an acknowledgement of receipt by the UE of the transmitted packet has been received; and
n) responsive to a determination that an acknowledgement of the transmitted packet has not been received, placing a buffered copy of the packet onto the ring network.

6. The computer-implemented method of claim 2 further comprising:
j) receiving a downlink packet by one of the plurality of selected available DUBSs;
k) responsive to receiving the downlink packet by the one of the plurality of selected available DUBSs,
1) Removing, by the one of the plurality of selected available DUBSs, the packet from the ring network,
2) inserting, by the one of the plurality of selected available DUBSs, the packet into its downlink buffer for wireless transmission to the UE.

7. The computer-implemented method of claim 6 further comprising:
l) Receiving, by the one of the plurality of selected available DUBSs, an acknowledgement of receipt by the UE of the transmitted packet; and
m) responsive to receiving the acknowledgement by the one of the plurality of selected available DUBSs,
1) Circulating the acknowledgement in the ring network, and
2) removing, by the one of the plurality of selected available DUBSs, the packet from its downlink buffer.

8. The computer-implemented method of claim 2 further comprising:
j) receiving, by each of the plurality of selected available DUBSs, a downlink packet destined for the UE;
k) responsive to receiving, by the selected available DUBSs, the downlink packet,
1) Buffering, by the selected available DUBSs, the received downlink packet, and
2) if the selected available DUBS is the primary serving DUBS, transmitting the buffered received downlink packet to the UE by the primary serving DUBS, and otherwise not transmitting the buffered received downlink packet to the UE by the non-primary service DUBS unless a further condition is met.

9. The computer-implemented method of claim 8 wherein the further condition is failure to receive, within a predefined time, an acknowledgement of receipt by the UE of the transmitted packet.

10. The computer-implemented method of claim 8 further comprising:

l) Receiving, by each of the plurality of selected available DUBSs, an acknowledgement of receipt by the UE of the transmitted downlink packet; and
m) responsive to receiving an acknowledgement of receipt by the UE of the transmitted downlink packet, removing, by each of the plurality of selected available DUBs, the received downlink packet from its buffer.

11. The computer-implemented method of claim 8 further comprising:
l) Determining that a data transmission or control path between the UE and the primary service DUBS is down;
m) responsive to the determination that the data transmission or control path between the UE and the primary service DUBS is down,
1) Selecting another one of the plurality of selected available DUBSs as a new primary service DUBS, and
2) transmitting any downlink packets destined for the UE and buffered in the new primary service DUBS, to the UE wirelessly.

12. The computer-implemented method of claim 2 further comprising:
j) receiving, by each of the plurality of selected available DUBSs, a downlink packet destined for the UE;
k) responsive to receiving the downlink packet by the selected available DUBS,
if the selected available DUBS is the primary serving DUBS, buffering, by the primary serving DUBS, the received downlink packet for wireless transmission to the UE by the primary serving DUBS, and
otherwise, if the selected available DUBS is not the primary serving DUBS not buffering the received downlink packet by the selected available DUBS.

13. The computer-implemented method of claim 12 further comprising:
l) Determining that a data transmission or control path between the UE and the primary service DUBS is down;
m) responsive to the determination that the data transmission or control path between the UE and the primary service DUBS is down,
1) Selecting another one of the plurality of selected available DUBSs as a new primary service DUBS,
2) providing, via the ring network, any downlink packets destined for the UE for which no acknowledgement was received, to the new primary service DUBS, and
3) buffering, in the new primary service DUBS, the downlink packets destined for the UE for which no acknowledgment was received, for wireless transmission to the UE.

14. The computer-implemented method of claim 1 wherein the ring network is a bidirectional buffer insertion ring network.

15. The computer-implemented method of claim 1 wherein a capacity of the ring network is higher than throughput requirements of applications served by the CUBS.

16. The computer-implemented method of claim 1 wherein the act of selecting, a plurality of the available DUBS is performed by the UE.

17. The computer-implemented method of claim 16, wherein the UE selects the plurality of available DUBS using received signal strength indicator (RSSI) values.

18. A computer-implemented method for use by a mobile user equipment (UE) in a ring network environment including a plurality of distributed units of a base station (DUBS) and a centralized unit of the base station (CUBS), the computer-implemented method comprising:
- a) responsive to the UE entering a target area (TA), conducting, by the UE, a search procedure to find any available DUBSs of the ring network with which the UE can communicate mobile data at a predetermined acceptable level;
- b) discovering by the UE, the available DUBSs with which it can communicate mobile data;
- c) selecting, by the UE, a plurality of the available DUBSs;
- d) submitting a request, by the UE, for the plurality of selected available DUBSs to serve as an access point for the UE on the ring network so that each of the plurality of selected available DUBSs will add an identifier of the UE (UE ID) to an address filter database (AFD); and
- e) receiving or determining, by the UE, channel state information with each of the plurality of selected available DUBSs.

\* \* \* \* \*